US007852350B2

(12) United States Patent
Barone et al.

(10) Patent No.: US 7,852,350 B2
(45) Date of Patent: Dec. 14, 2010

(54) GRAPHIC ANTIALIASING METHOD AND GRAPHIC SYSTEM EMPLOYING THE METHOD

(75) Inventors: Massimiliano Barone, Cormano (IT); Davide Terruzzi, Mariano Comense (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 698 days.

(21) Appl. No.: 11/828,824

(22) Filed: Jul. 26, 2007

(65) Prior Publication Data

US 2009/0027416 A1   Jan. 29, 2009

(51) Int. Cl.
| G06T 17/00 | (2006.01) |
| G06T 15/50 | (2006.01) |
| G09G 5/00 | (2006.01) |
| G09G 5/36 | (2006.01) |
| G06K 9/40 | (2006.01) |
| G06K 9/32 | (2006.01) |
| G06K 9/60 | (2006.01) |

(52) U.S. Cl. ............... 345/611; 345/426; 345/606; 345/614; 345/549; 382/266; 382/269; 382/300; 382/305

(58) Field of Classification Search ............. 345/418, 345/421–423, 426, 428, 581–582, 583–587, 345/606, 611, 613–614, 549, 545, 552; 382/254, 382/266, 269, 285, 274–276, 300, 305, 162, 382/167

See application file for complete search history.

(56) References Cited

U.S. PATENT DOCUMENTS

| 5,990,904 A | * | 11/1999 | Griffin | ................. 345/631 |
| 6,252,608 B1 | * | 6/2001 | Snyder et al. | ................. 222/79 |
| 6,469,707 B1 | * | 10/2002 | Voorhies | ................. 345/589 |
| 6,606,093 B1 | * | 8/2003 | Gossett et al. | ................. 345/441 |
| 6,906,728 B1 | | 6/2005 | Lewis | |
| 2002/0097241 A1 | * | 7/2002 | McCormack et al. | ................. 345/423 |
| 2003/0103054 A1 | * | 6/2003 | Montrym et al. | ................. 345/506 |
| 2003/0164840 A1 | * | 9/2003 | O'Driscoll | ................. 345/611 |
| 2005/0179700 A1 | | 8/2005 | Seiler et al. | |
| 2008/0012878 A1 | * | 1/2008 | Nystad et al. | ................. 345/613 |

FOREIGN PATENT DOCUMENTS

| EP | 0 321 095 A2 | 6/1989 |
| WO | 00/65540 A1 | 11/2000 |

OTHER PUBLICATIONS

Carpenter, L., "The A-buffer, an Antialiased Hidden Surface Method," Computer Graphics 18(3):103-108, Jul. 1984.
Jouppi, N. et al., "Ž 3: An Economical Hardware Technique for High-Quality Antialiasing and Transparency," Proceedings of the Eurographics/Siggraph Workshop on Graphics Hardware, pp. 85-93, 1999.
Schilling, A. et al., "EXACT: Algorithm and Hardware Architecture for an Improved A-Buffer," Proceedings of Siggraph 20th Annual International Conference on Computer Graphics and Interactive Techniues. The Eye of Technology; pp. 85-91, Jan. 1, 1993.

* cited by examiner

*Primary Examiner*—Wesner Sajous
(74) *Attorney, Agent, or Firm*—Lisa K. Jorgenson; Timothy L. Boller; Seed IP Law Group PLLC

(57) ABSTRACT

An antialiasing method includes: providing a first fragment; computing a first coverage area representing a portion of the first fragment covered by a first primitive; providing a second fragment juxtaposed to the first fragment and at least partially covered by a second primitive; processing the first coverage area to obtain a corrected coverage area indicative of a visible first fragment portion resulting from the juxtaposition of the fragments; and applying an antialiasing procedure based on the corrected coverage area.

64 Claims, 17 Drawing Sheets

A)　　　　　　　　　B)　　　　　　　　　C)

GRAPHIC ANTIALIASING METHOD AND GRAPHIC SYSTEM EMPLOYING THE METHOD

BACKGROUND

1. Technical Field

The present invention relates to the technical field of the graphic rendering. More particularly, the present invention relates to an antialiasing technique.

2. Description of the Related Art

Computer graphics is the technique of generating pictures with a computer. Generation of pictures, or images, is commonly called rendering. Generally, in three-dimensional (3D) computer graphics, geometry that represents surfaces (or volumes) of objects in a scene is translated into pixels and then displayed on a display device.

In computer graphics each object to be rendered is composed of a number of primitives. A primitive is a simple geometric entity such as, e.g., a point, a line, a triangle, a square, a polygon or high-order surface.

As it is known, aliasing affects computer generated images by producing, typically, jagged border objects. The aliasing phenomenon is caused by the limited dimension of a screen pixel. The objects are calculated into continuous space, but they are projected into screen pixel space and the conversion from continuous space into discrete space introduces aliasing problems.

Particularly, a pixel could be partially covered by an object (it typically occurs for border pixels) and since only a single color can be assumed by a pixel, the selection of pixel center color could generate an abrupt change about color gradient.

Antialiasing techniques try to smooth colors to minimize the effect of jagged borders. Two known techniques are super-sampling and multi-sampling, which are easy to implement in hardware form. The distinction between those methods is not well defined and some implementations can be regarded as belonging to both categories.

Super-sampling or FSAA (Full Scene Anti-Aliasing) renders the image at a higher resolution to be subsequently scaled to final dimension. With multisampling, each pixel is sampled at different positions and these samples can be used to reconstruct a final value.

Both methods require more than one sample per pixel of the final image. For example; 4×FSAA performs rendering at four-fold resolution to obtain 4 sub-pixel samples for each output pixel. Samples generated with super-sampling are combined with filtering techniques to mix those contributions with smoother edges. An example of card implementing the FSAA technique is the Matrox Parhelia-512 card.

The Multi-Sampling Anti-Aliasing (MSAA) is alternative to traditional super-sampling used in FSAA. As in super-sampling, multisampling computes the scene at a higher resolution with a small difference by using texture samples for sub-pixel. For example 4× super-sampling generates 4 texels (texture elements) for each sub-pixel, while 4×MSAA generates a single texture for each sub-pixel. An example of cards implementing the MSA technique is the NVIDIA GeForce 3 and 4 cards.

BRIEF SUMMARY

The applicants have noticed that there is a need in the field in increasing the quality of the antialiasing techniques. In accordance with a particular embodiment, an antialiasing method includes applying an antialiasing procedure based on the computing of a fragment area covered by a primitive. Particularly, the coverage area is computed by taking into account the occlusion due to the juxtaposition of fragments having same pixel coordinates.

The applicants have also noticed that the reduction of bandwidth and the limitation of memory space is a strongly felt task in computer graphics.

The applicants observe that according to the super-sampling technique N fragments per pixel are generated, where N is the number of super-samples. Then, this anti-aliasing technique uses an increasing (according to an N factor) of the bandwidth of the processing pipeline and the number of buffers employed to store fragments information.

According to another embodiment, an antialiasing method includes selecting two colors associated with the same pixel and performing a processing of said colors to define a final color of the pixel to be displayed.

BRIEF DESCRIPTION OF THE DRAWINGS

The characteristics and the advantages of the present invention will be better understood from the following detailed description of embodiments thereof, which is given by way of illustrative and non-limiting example with reference to the annexed drawings, in which.

DETAILED DESCRIPTIONS

Figure 1:
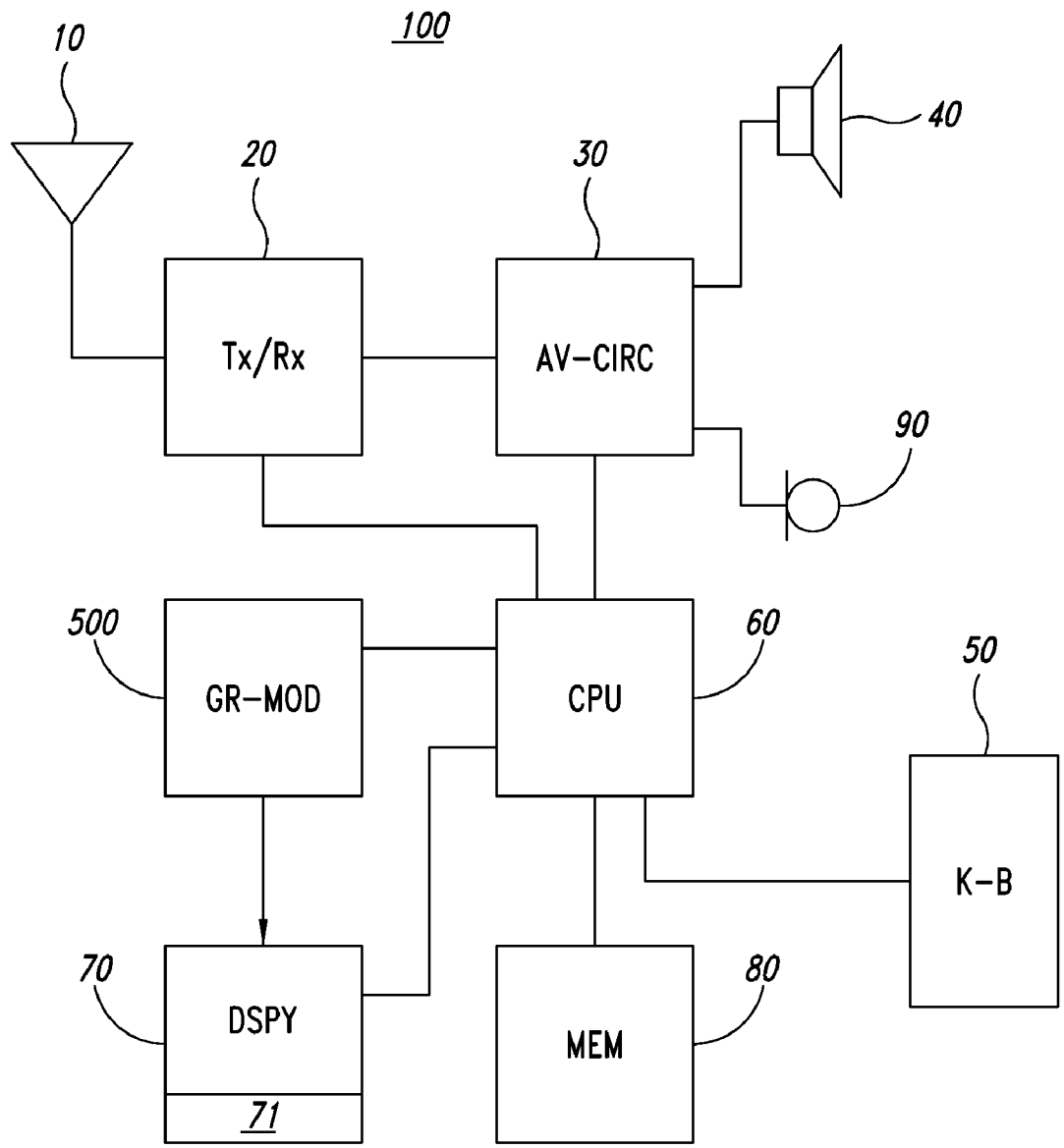
FIG. 1 schematically shows a graphic system in accordance with an embodiment of the invention.

FIG. 1 shows a graphic system 100 according to an embodiment of the invention and comprising a graphic module 500 (GR-MOD). The graphic system 100 illustrated in FIG. 1 is a mobile phone, but in accordance with further embodiments of the invention, graphic system 100 can be another system such as a personal digital assistant (PDA), a computer (e.g., a personal computer), a game console (e.g., a PlayStation®), a car navigation system, or a set top box (STB).

As an example, the graphic system 100 can be a cellular phone provided with an antenna 10, a transceiver 20 (Tx/Rx) connected with the antenna 10, and an audio circuit unit 30 (AU-CIRC) connected with the transceiver 20. A speaker 40 and a microphone 90 are connected with the audio circuit unit 30.

The graphic system 100 is further provided with a control processing unit 60 (CPU) for controlling various functions and, particularly, the operation of the transceiver 20 and the audio circuit unit 30 according to a control program stored in a system memory 80 (MEM), connected to the control processing unit 60. Graphic module 500 is coupled to and controlled by the control processing unit 60. Moreover, mobile phone 100 is provided with a display unit 70 provided with a corresponding screen 71 (e.g. a liquid crystal display, DSPY), and a user interface 50, such as an alphanumeric keyboard 50 (K-B).

The graphic module 500 is configured to perform a set of graphic functions to render an image on the screen 71 of the display 70. Preferably, the graphic module 500 is a graphic engine configured to rendering images, offloading the control processing unit 60 from performing such task. As used herein, the term "graphic engine" is meant a device which performs rendering in hardware or software not running on a CPU, but on another coprocessor such as a digital signal processor (DSP). The term "graphic accelerator" is equivalent to the term graphic engine.

Alternatively, the graphic module 500 can be a graphic processing unit (GPU) wherein the rendering functions are performed on the basis of hardware and software instructions executed on a dedicated processor such as, e.g., a DSP. In accordance with a further embodiment, some or all the rendering functions are performed by the control processing unit 60.

Figure 2:
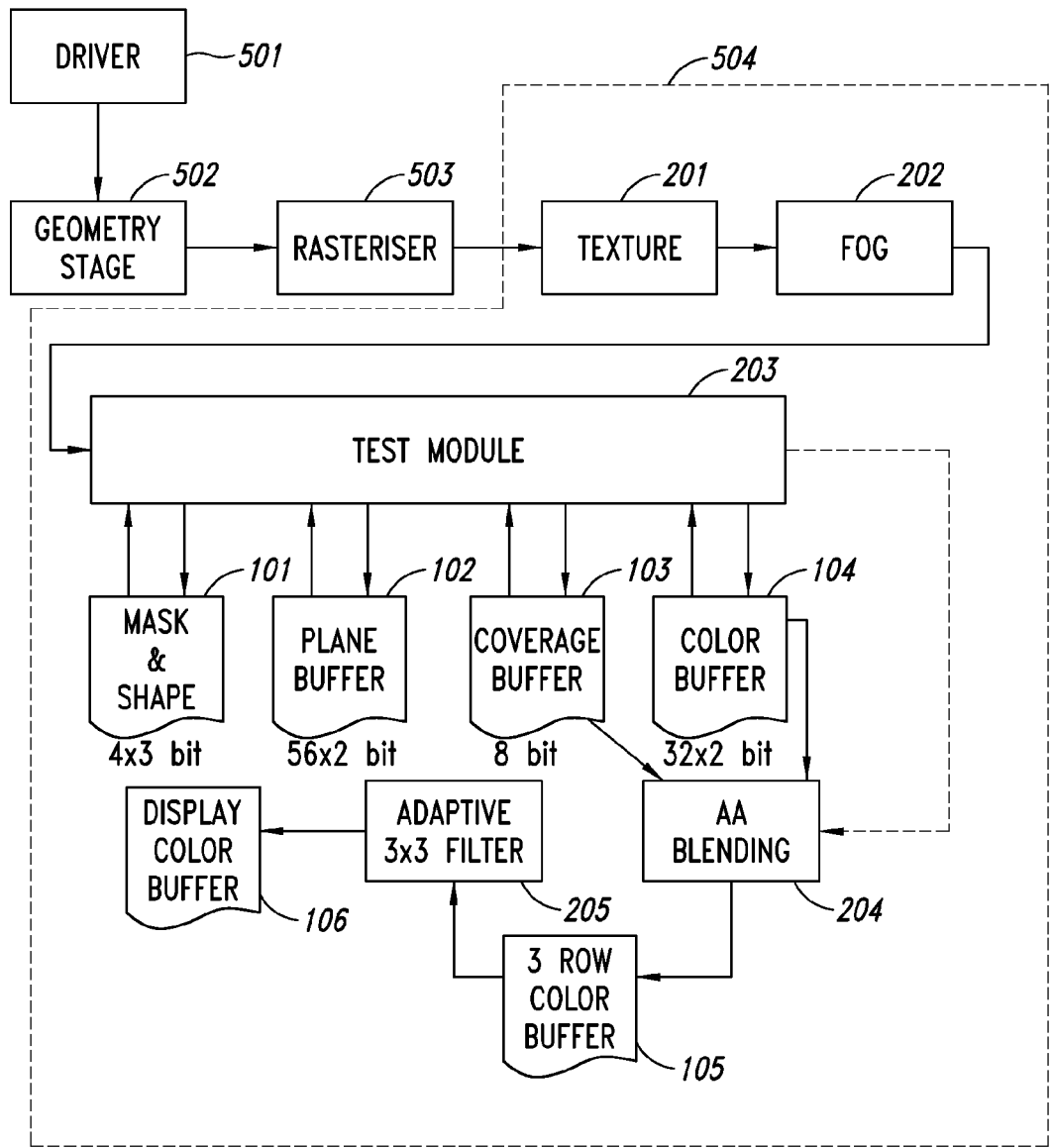
FIG. 2 shows an example of a graphic module in accordance with an embodiment of the invention and employable by said system.

In FIG. 2 a functional diagram of the graphic module 500 includes functional blocks. Graphic engine 500 can perform the rendering of 3D (three dimensional) scenes, that are displayed on the screen 71 of the display 70. The graphic engine 500 can operate, as an example, according to a sort-middle rendering approach (also called "tile based" rendering) or according to an immediate mode rendering.

The particular graphic engine 500, illustrated in FIG. 2, comprises a driver 501, a geometry stage 502 (also known as TnL stage—Transform and Lighting stage) a rasterizer stage 503 and a fragment processor 504 which is coupled to the display 70.

The driver 501 is a block having interface tasks and is configured to accept commands from programs (e.g. Application Protocol Interface—API) running on the control processing unit 60 and then translate them into specialized commands for the other blocks of the graphic engine 500.

The geometry stage 502 is configured to process primitives and apply transformations to them so as to move 3D objects. A primitive is a simple geometric entity such as, e.g., a point, a line, a triangle, a square, a polygon or high-order surface. In the following, reference will be often made to triangles, which can be univocally defined by the coordinates of their vertexes, without other types of employable primitives.

The geometry stage 502 is provided with a transformations stage configured to apply geometric transformations to vertices of the primitives in each single object of the scene to transform the primitives from a user space to a screen space. As an example, transformations are of the affine type and defined in a affine space where two entities are defined: points and vectors. Results of transformations are vectors or points.

Moreover, the particular geometry stage 502 described can comprise the following known stages (not shown in the figures): a lighting stage, a primitive assembly stage, a clipping stage, a "perspective divide" stage, a viewport transformation stage and a culling stage.

The rasterizer stage 503 is configured to perform processing of primitive data received from the previous geometry stage 502 so as to generate pixel information images such as the attribute values of each pixel. The attributes are data (color, coordinates position, texture coordinate, etc.) associated with a primitive. As an example, a triangle vertex has the following attributes: color, position, coordinates associated with texture. As known to the skilled person, a texture is an image (e.g. a bitmap image) that could be mapped on the primitive. According to the described embodiment, the rasterizer 503 is configured to provide a single fragment for each pixel but generating both "internal" and "external" pixels. An internal (external) pixel is a pixel having its center internal (external) to a primitive.

In general, the fragment processor 504 defines fragments from the received pixels, by associating a fragment depth and other data to pixels and performing suitable tests on the received pixels. The particular fragment processor 504 shown in FIG. 2 is provided with a texture module 201, a fog module 202, a test module 203, an antialiasing blending module 204 and, preferably, an adaptive filter 205.

The texture module 201 is configured to perform texture mapping such as to process the data received from the rasterizer 503 in order to add detail, surface texture, or color to fragment belonging to a corresponding primitive. The fog module 202 is configured to apply a fog effect to the fragment exiting the texture module 201.

Figure 3:
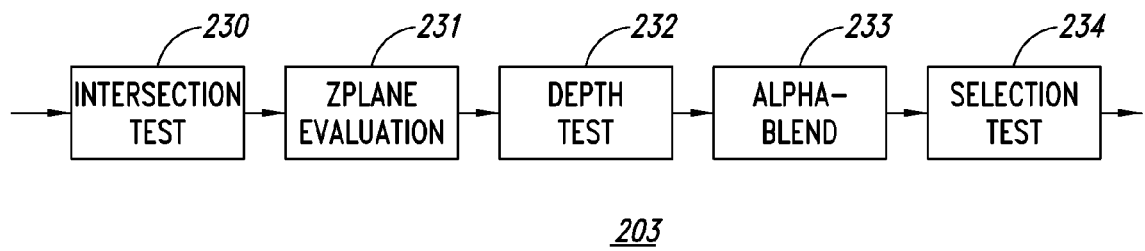
FIG. 3 shows a fragment processor according to a particular embodiment of the invention and employable by said graphic module.

The test module 203, which will be described in greater detail later, is configured to perform several tests. An example of the test module 203 is shown in FIG. 3 under the form of a pipeline comprising a plurality of stages: an intersection test stage 230, a Z plane evaluation stage 231, a depth test stage 232, an alpha-blend test stage 233 and a selection test stage 234.

According to the particular example shown in FIG. 2, the test module 203 is associated with the following memory buffers: mask and shape buffer 101, plane buffer 102, a coverage buffer 103 and a first color buffer 104.

The antialiasing blending module 204 is adapted to perform a blend processing of the color associated with two overlapping fragments in order to determining a resulting color to be associated with the corresponding pixel. The antialiasing blending module 204 cooperates with the coverage buffer 103, the first color buffer 104 and a second color buffer 105 wherein the resulting color is stored.

The adaptive filter 205 is configured to perform a further processing of the data stored into the second color buffer 105 so as to avoid artifacts. The result of the adaptive filter is stored in a display color buffer 106 which is coupled to the display 70.

Operation of the Rasterizer 503

In the present chapter particular embodiments of some of the processing steps performed, according to an example, by the rasterizer 503 are described. Particularly, the following information can be determined by the rasterizer 503 for each fragment: coverage area, pixel shape mask, and pixel barycenter. The above listed information can be computed by respective hardware and/or software modules included in the rasterizer 503.

It has to be observed that the described example of antialiasing technique uses only one fragment per pixel, and it distinguishes between internal and border fragments. At end of a frame, the technique performs antialiasing blending using module 204 (FIG. 2) only on border pixels. In the following description, a pixel crossed at least by one edge of a primitive is a border (or edge) pixel.

Figure 4:
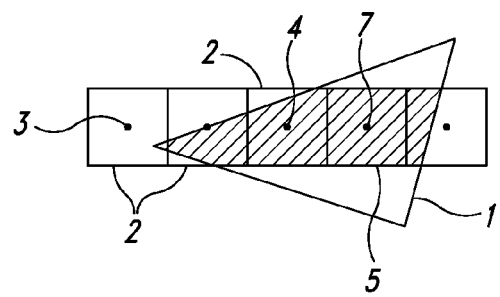
FIG. 4 shows an example of a primitive covering pixels.

A first information which can be computed by the rasterizer 503 is the coverage area. The coverage area represents a portion of a fragment covered by a specific primitive and can be expressed as the percentage of a pixel, associated with the fragment, covered by the specific primitive. As an example, the coverage area is equal to 1 for internal (not border) pixels, and is equal to a value included in a range [0 . . . 1] for border pixels. FIG. 4 shows a primitive 1 (e.g. a triangle), border pixels 2 (having respective centers 3 and 4) and an internal pixel 5 (having respective center 7). Two examples of methods for computing the coverage area will be described later with reference to FIGS. 28 and 29.

Figure 5:
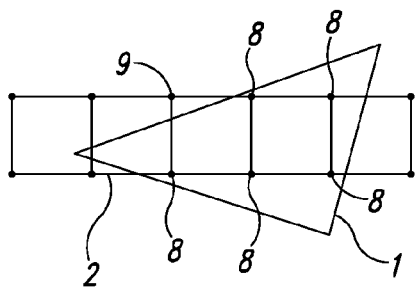
FIG. 5 shows an example a shape mask representing the shape and position of a primitive inside a pixel.

A second information which can be computed by the rasterizer 503 is the pixel shape mask (FIG. 5). A pixel shape mask is an N-bit mask that represents the shape and position of a primitive inside the pixel. As an example, a 4-bit mask is enough to describe a good approximation of the coverage shape. The pixel shape mask can be calculated by the rasterizer 503 evaluating the sign of the edges equation in the four pixel corners. Each bit is set to 1 if the corner that it represents is inside the primitive, 0 otherwise. Internals pixel always have all mask-bits fixed to 1. A pixel shape mask, is used to adjust the coverage value as will be clear later. FIG. 5 shows the triangle 1 and the corners 8 that are inside primitive 1. Corner 9 is a corner of a pixel 2 which is outside primitive 1.

It has to be noticed that two of the four bits representing the corners can be shared between adjacent pixels of the same primitive, and also the two lower bits can be shared using a 4-bit row buffer. With such optimizations, the pixel shape mask calculation is reduced to a sign evaluation (of the three edge equations describing the primitive) in only one pixel corner. To resume, three corner bits come from previous pixels and just one corner bit is new for each pixel, so it is possible to define it as a "1x" mask ("one for" mask). The technique used to compute the pixel shape mask is similar to the known flip-quad approach.

Figure 6:
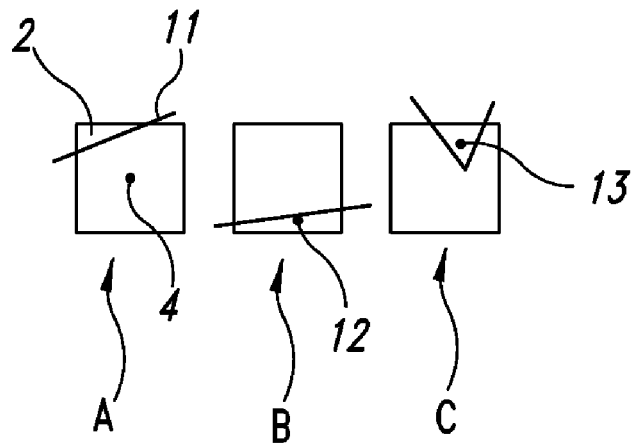
FIG. 6 shows examples of different positions of pixel barycenter.

A third information that can be computed by the rasterizer 503 is the pixel barycenter which is expressed by 2D coordinates (in screen space) of a point inside the primitive. According to a particular criterion, if the center of the pixel is inside the primitive, then it's considered as the barycenter otherwise rasterizer 503 uses edge information to calculate a different point as the barycenter. Internal pixels always have the center of the pixel inside the primitive. FIG. 6 shows the situation A wherein pixel 2 has the center 4 placed inside the triangle having edge 11. In addition, FIG. 6 shows situation B wherein the chosen barycenter is point 12 and situation C wherein the chosen barycenter is point 13.

Barycenter coordinates are used to calculate some attributes of border fragments (depth value, color, fog, etc.). For each edge that crosses the pixel, a barycenter point is calculated. If the pixel is crossed by two or more edges, the two or more barycenters are averaged together.

Figure 7:
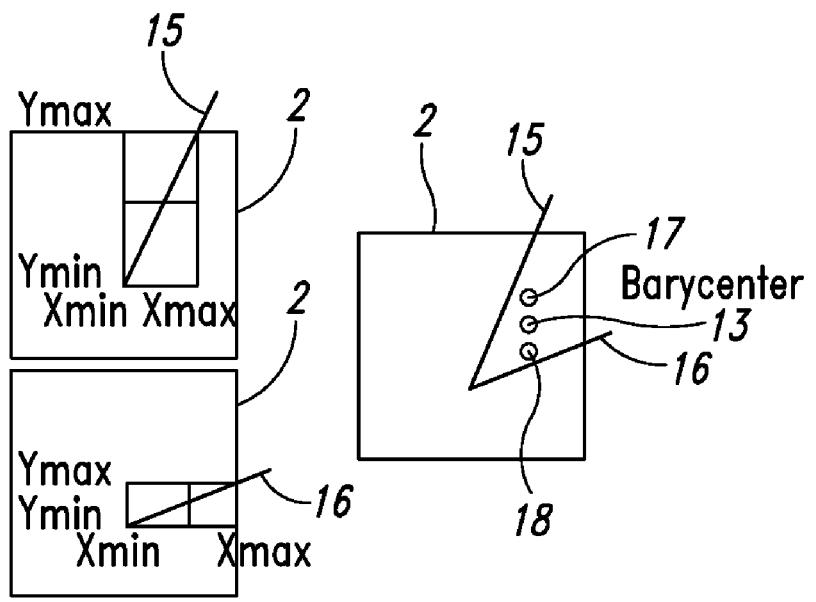
FIG. 7 shows an example of computing of a pixel barycenter.

With reference to FIG. 7, the rasterizer 503 computes, according to an example, the edge-pixel intersections: $Y_{min}$, $Y_{max}$, $X_{min}$, $X_{max}$. Wherein, $Y_{min}$, $Y_{max}$ ($X_{min}$, $X_{max}$) are the minimum and maximum Y (X) coordinates of the intersection between a primitive edge and the pixel edge, respectively.

Then, in accordance with a particular embodiment, the barycenter coordinates ($Y_b$ and $X_b$) of an edge is defined depending on the edge slope:

if slope is greater than 45 degrees, then $Y_b=(Y_{min}+Y_{max})/2$ (mean value) and $X_b$ depends on edge kind:

$X_b=X_{min}+0.75(X_{max}-X_{min})$ if the edge is left, or $X_b=X_{min}+0.25(X_{max}-X_{min})$ if the edge is right;

if slope is less than 45 degrees, then $X_b=(X_{min}+X_{max})/2$ (mean value) and $Y_b$ depends on edge kind:

$Y_b=Y_{min}+0.75 \cdot (Y_{max}-Y_{min})$ for right edges, $Y_b=Y_{min}+0.25 \cdot (Y_{max}-Y_{min})$ for left edges.

With reference to FIG. 7, pixel 2 is shown which is crossed by a first edge 15 and a second edge 16. Two points 17 and 18 are obtained by the above algorithm. The chosen barycenter 19 is obtained by averaging coordinates of points 17 and 18.

A fourth information that can be provided by the rasterizer 503 is the Z plane which is a 3D equation (in transformed space coordinates) of the plane on which the triangle (or the used primitive) lies. Particularly, a coefficients calculation is made only once per primitive, in the setup phase of the rasterizer 503.

A plane equation has the following expression:

$$a \cdot x + b \cdot y + c \cdot z + d = 0$$

Given the three vertex coordinates $(x_0, y_0, z_0)$, $(x_1, y_1, z_1)$, $(x_2, y_2, z_2)$ in transformed-space coordinates (x and y in screen space, z of projection space with range [0 . . . 1]) the coefficient a, b, c and d are:

$$\begin{cases} a = (y_1 - y_0) \cdot (z_2 - z_0) - (z_1 - z_0) \cdot (y_2 - y_0) \\ b = (x_2 - x_0) \cdot (z_1 - z_0) - (x_1 - x_0) \cdot (z_2 - z_0) \\ c = (x_1 - x_0) \cdot (y_2 - y_0) - (y_1 - y_0) \cdot (x_2 - x_0) \\ d = -x_0 \cdot a - y_0 \cdot b - z_0 \cdot c \end{cases}$$

Since primitives perfectly perpendicular to projection plane (that have c=0) are not visible, the plane equation can be stored using only three coefficients without lose of information:

$$z = A \cdot x + B \cdot y + D = (-a/c) \cdot x + (-b/c) \cdot y + (-d/c)$$

It is noticed that coefficients A and B can also be calculated as slopes: A=dz/dx, B=dz/dy.

Z plane is used to evaluate depth value in the barycenter point, and the new edge equation in case of primitive intersections. It fully replaces a depth buffer of prior art techniques.

Buffers 101-104

Reference is made again to FIG. 2 and to buffers 101-104. It has to be noticed that in accordance with an example, the described antialiasing technique is based on two colors (and related fragment attributes) associated with two corresponding fragments (first fragment and second fragment) that are suitably selected (by the selection stage 234, FIG. 3) and stored to be used for the antialiasing blending step. In general, buffers 101-104 store information computed by the rasterizer 503 and are managed (read and updated) by the test module 203 (FIG. 2 and FIG. 3).

In greater detail, the mask and shape buffer 101 comprises two "fragment shape mask buffers" each storing the above defined pixel shape masks (FIG. 5) respectively associated with the selected first and second fragments. As an example, a 4 bit fragment shape mask can be used and therefore each of the two mask shape buffers can be a 4 bit buffer.

Moreover, mask and shape buffer 101 also includes a "pixel mask buffer" which stores data concerning a pixel shape mask of the original fragment that is to say the shape mask describing the primitive inside a pixel before the generation of the shape masks associated with the first and second fragments. If three colors are in a pixel, only two colors are stored in one embodiment of the described antialiasing method and the third color is eliminated. As will be clear hereinafter, a depth test will be carried out which is based also on the barycenters evaluation (stages 231 and 232). If the barycenter is evaluated taking into account only the shape masks of the selected fragments, it is possible that the determined barycenter is not placed into the primitive. To avoid this situation, the shape mask of the original fragment is stored in the mask and shape buffer 101 and is used for the depth test (particularly, in stages 231 and 232) to correctly evaluate the barycenter. In FIG. 2 the expression "4×3 bit" refers to a non-limiting example, wherein the mask and shape buffer 101 includes three 4 bit buffers.

The plane buffer 102 is a double buffer which replaces a normally used depth buffer and stores plane equations and a barycenters data associated to two colors stored in the color buffer 104. Particularly, the plane equation includes three coefficients so, according to an example, 48 bits are used to obtain a good precision in depth value calculation. In accordance with the example, a barycenter point can be stored with only 8 bits, assuming to store not the real (floating point) coordinates values but its position in a super-sample grid.

The coverage buffer 103 stores per pixel the above defined coverage area value for one of the two selected fragments. As it will be clear later, a single coverage buffer can be used since a second coverage buffer is not necessary because the coverage values of the selected fragments are complementary each other.

The color buffer 104 is a double buffer storing two colors associated to the selected fragments. Each stored color comprises RGB and α (transparence) information.

Rendering Process and Antialiasing Method

In operation, the user of the mobile phone 100 employs the keyboard 50 in order to select a 3D graphic application, such as a video game. As an example, such graphic application allows to show on the screen 71 several scenes. The scenes correspond to what is visible for an observer who can move assuming different positions. Accordingly, software corresponding to said graphic application runs on the control processing unit 60 and activates the graphic module 500. The geometry stage 502, under the command of the driver 501, provides to the rasterizer 503 primitives data and, particularly, coordinates defining the primitives (such as coordinates of triangles vertexes) to be displayed.

Figure 8:
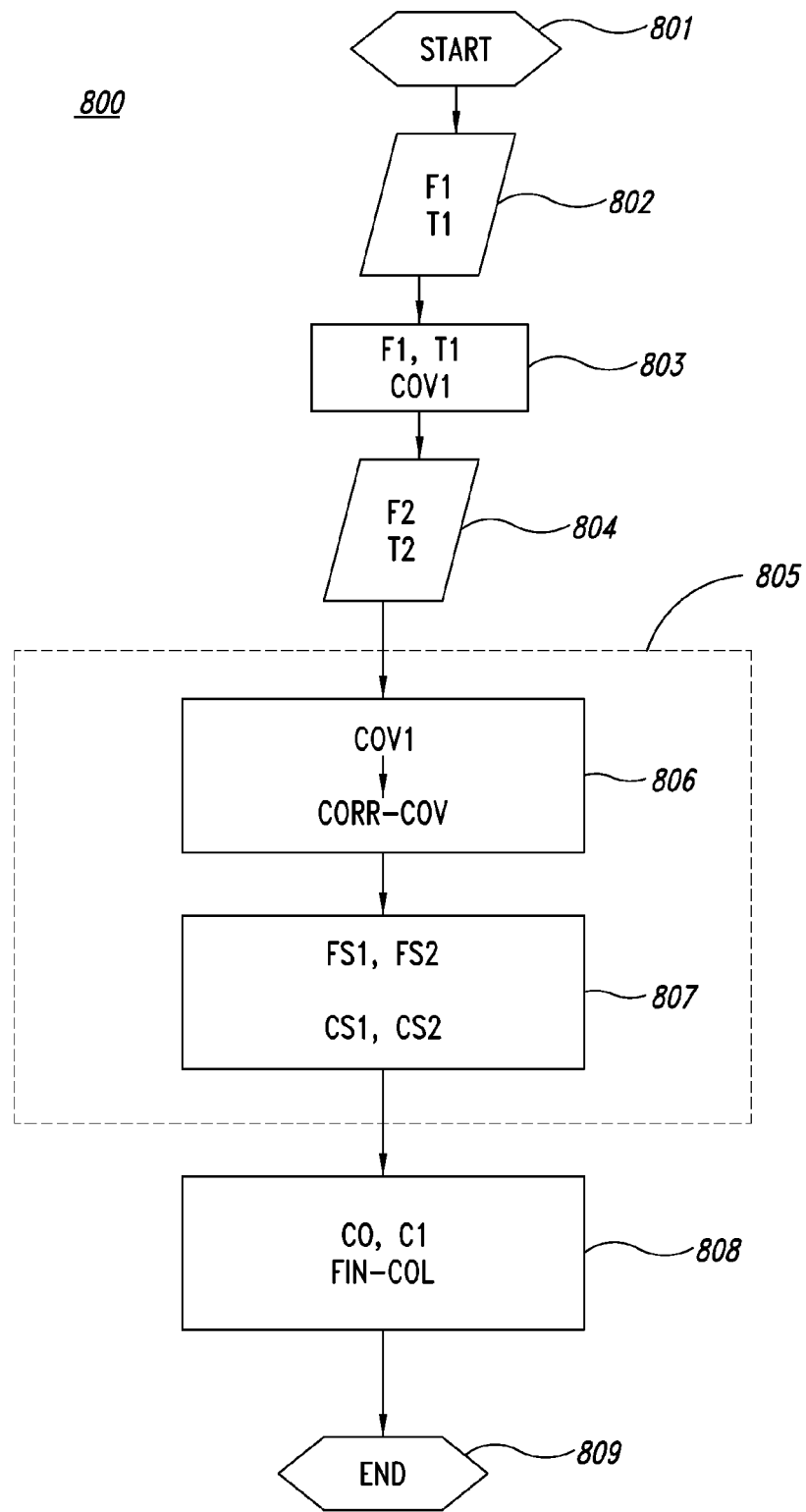
FIG. 8 shows by means of a flow chart an example of an antialiasing method in accordance with the invention.

Moreover, an embodiment of the rendering process includes an antialiasing method 800 shown in FIG. 8, by a flow chart. The particular antialiasing method shown in FIG. 8 comprises a symbolic starting step 801 and a following step 802 in which the rasterizer 503 provides a first submitted fragment F1, obtained on the basis of the data received from the geometry stage 502. The first submitted fragment F1 is partially covered by a first primitive T1.

The rasterizer 503, further computes, in a step 803, a first coverage area cov1 representing a portion of the first submitted fragment F1 covered by the first primitive T1. In a step 804, rasterizer 503 provides a second submitted fragment F2 juxtaposed to the first submitted fragment F1 and at least partially covered by a second primitive T2. The second submitted fragment F2 overlaps the first submitted fragment F1 and therefore the visible portion of the latter fragment also depends on the second submitted fragment F2. Therefore, there is a situation of fragments occlusion.

The antialiasing method 800 further includes a selection step 805, in particular performed by the selection stage 234 (FIG. 3). The selection step 805 includes a correction step 806 wherein the first coverage area cov1 is processed to obtain a corrected coverage area CORR-Cov indicative of a visible first submitted fragment portion resulting from the juxtaposition of said fragments. This correction allows to manage the situation of fragments occlusion.

The antialiasing method 800 is based on said corrected coverage area CORR-Cov. Particularly, the selection step 805 further includes a selection step 807 in which only two fragments FS1 and FS2 are selected among a plurality of three fragments associated with the same pixel coordinates x, y. More particularly, the selection is carried out for each border pixel, that is to say a pixel crossed by at least one edge of a primitive to be renderized.

Two colors CS1 and CS2, associated to said selected fragments FS1 and FS2, are used in a step 808 by the antialiasing blending module 204 (FIG. 2), together with an associated corrected coverage area information, to obtain a final color FIN-COL associated with the pixel to be displayed. The flow chart of FIG. 8 terminates with a symbolic end step 809.

Correction Step 806: Fragment Occlusions Managing

A particular embodiment of the correction step 806 (FIG. 8) will be described hereinafter.

As indicated in FIG. 8, when two fragments (F1 and F2) are juxtaposed, the coverage area of the covered one will be reduced by a portion of the overlapping one. The perfect overlap calculation could be done analytically employing primitive edge equations but it is too complicated and will increase the band of the graphic engine 500.

Figure 9:
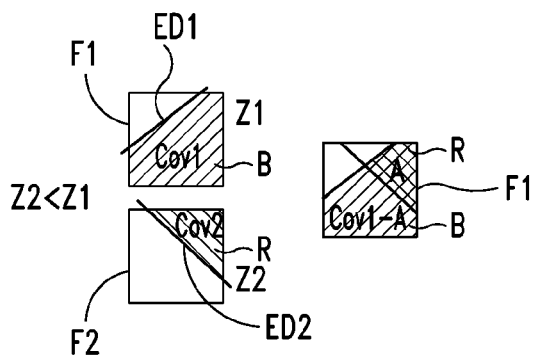
FIG. 9 shows an example of fragment occlusion situation.

FIG. 9 shows a fragment occlusion situation. Fragment F1 has a depth (Z coordinate) equal to Z1 and is partially covered by a primitive having edge ED1. Fragment F2 has a depth equal to Z2 which is lower than Z1 and therefore it covers the first fragment F1 and is partially covered by another primitive having a respective edge ED2. First fragment F1 has a coverage area equal to cov1 and the second fragment F2 has a coverage area equal to cov2. The coverage areas cov1 and cov2 are computed by the rasterizer 503. The portion of the fragment F1 resulting from the overlapping of the fragment F2 over fragment F1, has a visible coverage area cov1-A. Therefore the occluded quantity A should be calculated.

In accordance with the described embodiment, fragment occlusions is solved, with some approximations, using the above defined shape mask (FIG. 5) to correct coverage areas.

According to the embodiment described, the pixel coverage area is defined by a pseudo-area which is the coverage obtained with the shape mask. In particular, the shape mask is defined by four bits associated with a respective corner of the considered fragment. The bits of the shape mask are set to 1 when the corresponding corners are inside the primitive and are set to 0 when the corresponding corners are outside the primitive.

Figure 10:
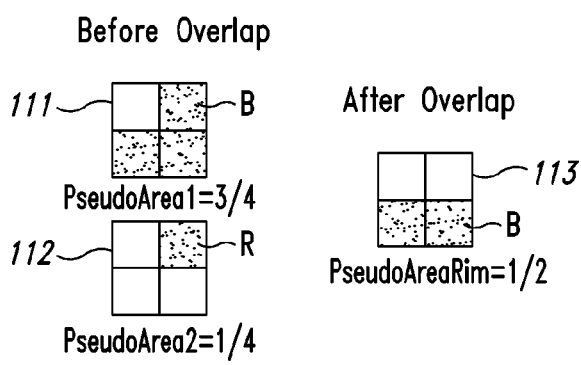
FIG. 10 shows an example of shape masks.

For example, if a shape mask is 0001 the fragment pseudo-area is 0.25. There are only four possible values of pseudo-area: ¼, ½, ¾ and 1. FIG. 10 shows the shape masks M1 and M2 and the pseudo-areas, pseudoArea1 and pseudoArea2, of the two fragments F1 and F2 before and after the overlap. PseudoAreaRim is the pseudo-area of the visible part of the overlapped fragment (having shape mask M3).

The corrected coverage are CORR-cov, which is the visible part of the first fragment F1 (the overlapped one), is computed (e.g. by the section stage 234) in accordance with the following formula:

$$CORR - cov = cov_1 - p \cdot cov_2$$

$$= cov_1 - \frac{pseudoArea_1 - pseudoAreaRim}{pseudoArea_2} \cdot cov_2$$

wherein p is the percentage of the second fragment F2 that covers the first fragment F1.

This approximation does not take in account that a portion of the overlapped fragment F1 is still visible after the occlusion. In fact, when the overlapping fragment F2 has a coverage area ($cov_2$) much bigger than the overlapped coverage area ($cov_1$), the corrected coverage CORR-cov expressed above can assume a zero (negative values are clamped to 0) also when a portion of the overlapped fragment F1 is visible.

To avoid this problem the algorithm may use, according to another embodiment, a different formula. Given two fragments F1 and F2 and their coverage areas ($cov_2$ and $cov_1$) and masks (PseudoArea2 and PseudoArea1), assuming that the second fragment F2 overlaps the first fragment F1, the corrected coverage area of the first fragment F1 is obtained with the following formulas:

$$CORR - Cov = cov_1 \cdot p_1 + \lfloor cov_1 \cdot (1 - p_1) - cov_2 \cdot p_2 \rfloor_{\geq 0}$$

$$= cov_1 \cdot \frac{pseudoAreaRim}{pseudoArea_1} + \left[ \begin{array}{c} cov_1 \cdot \left(1 - \frac{pseudoAreaRim}{pseudoArea_1}\right) - \\ \frac{pseudoArea_1 - pseudoAreaRim}{pseudoArea_2} \cdot cov_2 \end{array} \right]_{\geq 0}$$

the ratio $p_1$=PseudoAreaRim/PseudoArea1 represents the percentage of visible portion of the first fragment F1.

Figure 11:
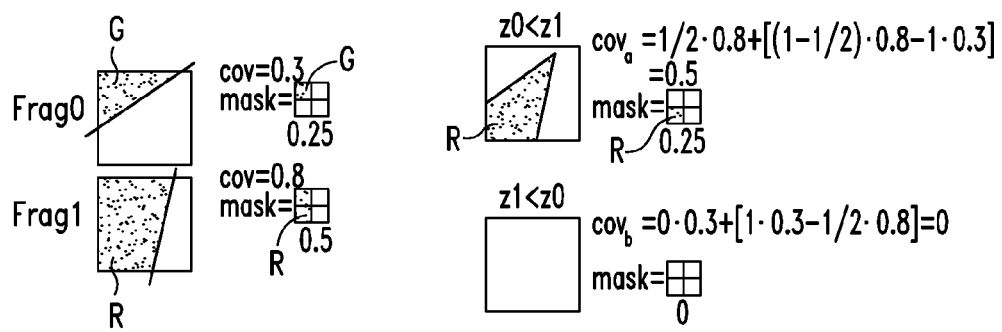
FIG. 11 shows an example of correction of coverage area in occlusion situations.

The meaning of the formula is to maintain the visible portion of overlapped fragment ($p_1 \cdot cov_1$), and subtract the percentage of overlapping fragment ($p_2 \cdot cov_2$) from the covered portion of Frag1 ($(1-p_1) \cdot cov_1$). FIG. 11 shows an example of application of the above formula at a fragment Frag0 an another fragment Frag1, in two different cases: z0<z1 (CORR-Cov=$cov_a$–0.5) and z0>z1 (CORR-Cov=$cov_b$=0).

The previous formula can't be applied with empty-mask fragments (pseudo-area=0). A fragment has an empty-mask when all four pixels corners are not inside the primitive. In these cases there is no information about primitive position.

In order to make an occlusion correction when there is an empty-mask fragment the fragments can be considered as full covered or full visible. In particular, given two fragments F0 and F1 and their coverage (cov0 and cov1, respectively) and mask (PseudoArea0 and PseudoArea1), assuming that fragment F0 overlaps fragment F1, and at least one of the two fragments has an empty-mask, the corrected coverage area CORR-Cov of fragment F1 is obtained with the formula:

$$\begin{cases} cov_1 & \text{if } cov_1 < cov_0 \\ cov_1 - cov_0 q & \text{if } cov_1 \geq cov_0 \end{cases}.$$

Figure 12:
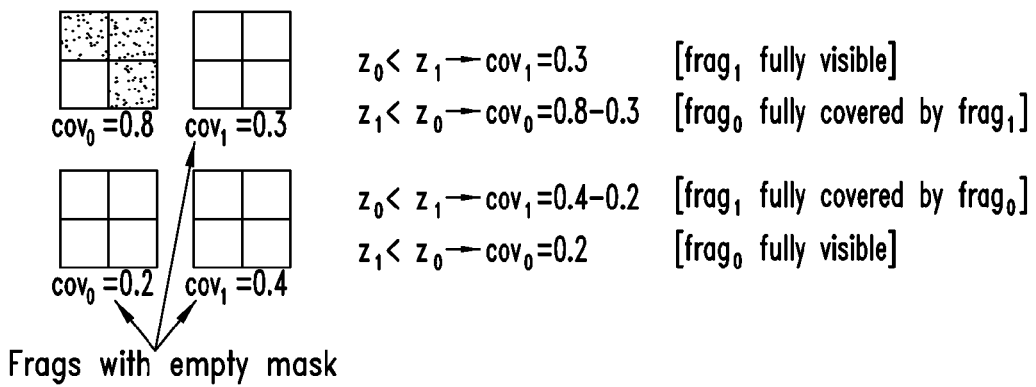
FIG. 12 shows an example of occlusion correction when there is a fragment having empty shape mask.

This means that if the covered (overlapped) fragment has a small area it's considered to be fully visible (no change in coverage area); instead if the covered (overlapped) fragment has a big area it's considered to be totally covered by the other fragment (the coverage area is reduced by the overlapped area). FIG. 12 shows an example of application of the above criterion.

Before describing particular embodiments of the selection step 807 and the antialiasing blending step 808 (FIG. 8), the operation of the stages 230-233 (FIG. 3) will be discussed.

Example of Operation of the Intersection Test Stage 230.

Figure 13:
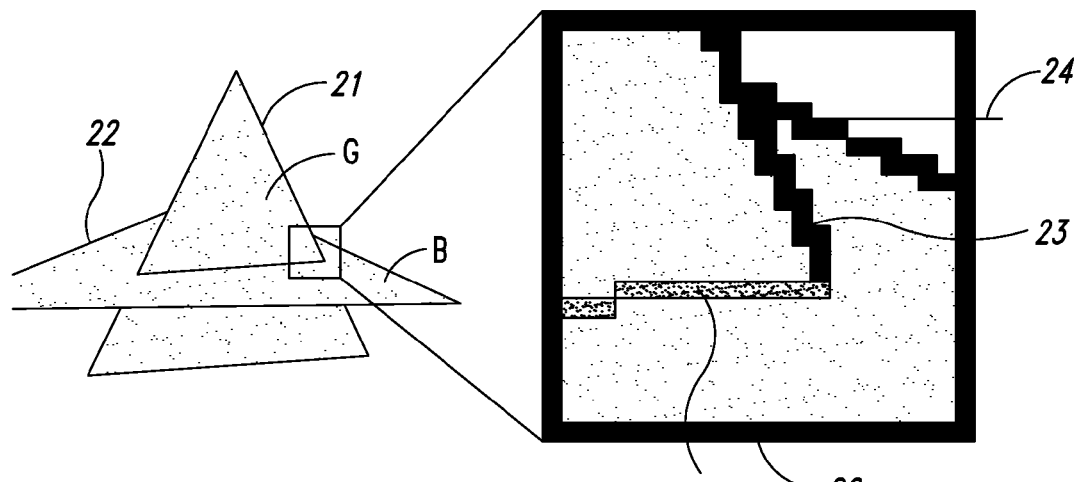
FIG. 13 shows an intersection between primitives.

When two primitives (e.g. two triangles) intersect each other, a new edge is created. FIG. 13 shows a first triangle 21, a second triangle 22, primitive edges 23 and 24 and a intersection edge 25 in a pixel 26. The intersection test stage 230 has the aim of identifying a pixel crossed by an edge generated by an intersection. The pixel crossed by an intersection edge is considered as "a border edge" which will be involved in the antialiasing procedure:

Given the two planes representing the planes on which the primitives lie:

$z = A_0 \cdot x + B_0 \cdot y + D_0$
$z = A_1 \cdot x + B_1 \cdot y + D_1$

The equation of the new edge is obtained with the following formula (edge equation):

$0 = (A_0 - A_1) \cdot x + (B_0 - B_1) \cdot y + (D_0 - D_1)$

To verify if a pixel belongs to the intersection edge the sign of edge equation in the four pixel corners is tested. If all corners have the same sign, then pixel is not a border pixel.

The intersection test stage 230 receives the new or current pixel coverage area, barycenter and mask from rasterizer 503, while the data concerning two old or "previous processed" fragments with the same pixel coordinates are stored into the coverage buffer 103 and the mask and shape buffer 101.

The intersection test allows to select the old fragment buffer with the intersection, then the new fragment and the old selected one will be managed. If an intersection edge is found in a pixel then coverage area, mask and barycenter of a new fragment will be modified; old fragment's attributes will be modified only if alpha-blend is not enabled, because also the covered old fraction fragment will be used later to manage blending color. In this way old and new fragments will be transformed into their visible fraction.

Figure 14:
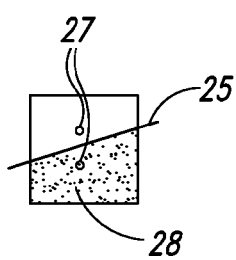
FIG. 14 shows an edge resulting from primitives intersection.

With the above indicated intersection edge equation two new barycenters are computed: they are two points in the two pixel regions formed by the intersection edge. The two barycenters are used to discover which is the new visible fraction area and which is the old visible fraction area. FIG. 14 shows the intersection edge 25 the two barycenters 27 and the visible area of the new fragment 28.

The intersection edge is given by plane intersection, but primitives intersection could give different visible fractions, so the shape mask is used to build the real visible area.

Figure 15:
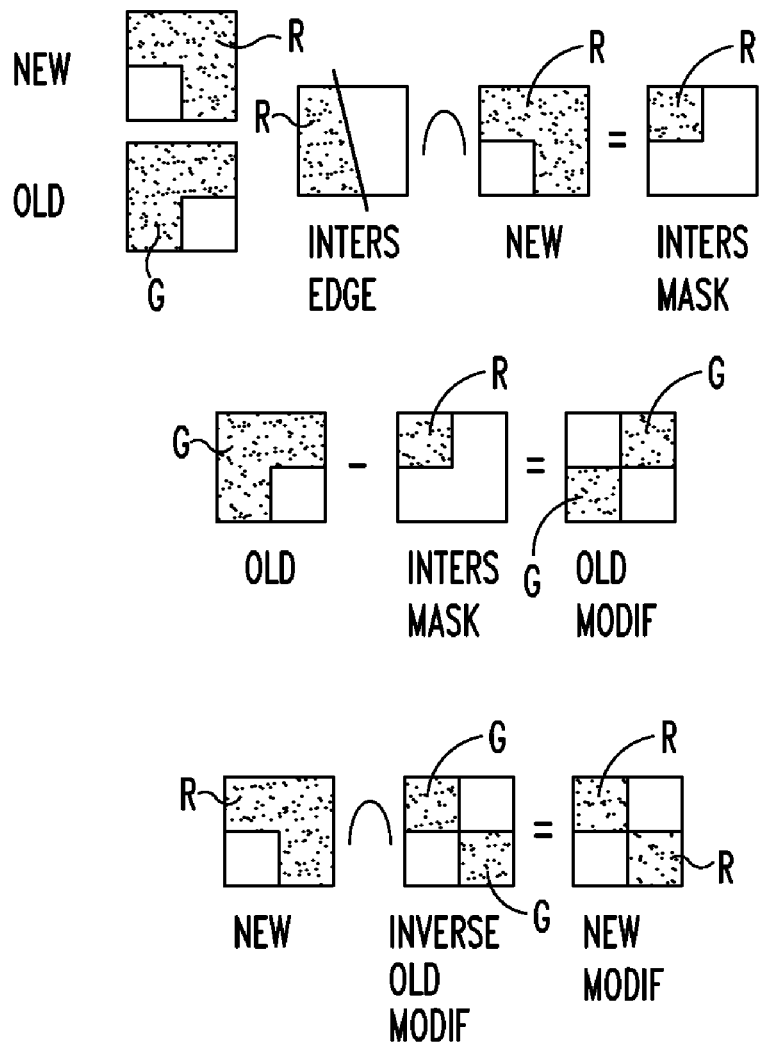
FIG. 15 and FIG. 16 illustrate examples of managing of shape masks in case of primitive intersection in accordance with an embodiment of the invention.

FIG. 15 shows the shape mask (New) of a new fragment, the shape mask (Old) of an old fragment and the shape mask of an intersection edge pixel (Inters Edge).

The "sign of edge equation" test gives an intersection edge mask (Inters Edge) that it is used to perform an intersection (Boolean "and" operator) with new fragment's shape mask (New) so as to obtain an intersection mask representing the visible part of new fragment (Inters Mask). Old fragment's visible shape mask (Old modif) is given by a difference (Boolean operator A+$\overline{B}$) with intersection mask (Inters Mask); new shape mask (New modif) is given by an intersection with the inverse of old fragment mask Inverse Old mod). This procedure allows to manage the occlusions generated from the intersection. In the example of FIG. 15 colors R (red), G (green).

Intersection Edge equation gives the visible coverage area of the new fragment. But this value (named "intersection coverage") is correct only when new fragment is internal. To evaluate the border fragment it is necessary an extra calculation.

According to an example, for border fragments, coverage area of the visible piece is:

$$covVisible = cov_2 \cdot p_1 + [cov_2 \cdot (1-p_1) - p_2 \cdot (1-cov_1)]_{\geq 0}$$

where $cov_1$=intersection coverage of new fragment, $cov_2$=intersection coverage, or new fragment coverage if less than intersection coverage, $p_1$=percentage of visible part of new fragment, $p_2$=percentage of old fragment that covers new fragment.

It therefore possible to assign coverage values for old and new fragments. Visible part of new fragment mask is equal to covVisible, above shown. If visible old fragment mask is empty (all mask-bit equal to 0) then old coverage is 0; else old coverage is given by:

$$covOld = covOld - p_3 \cdot covVisible$$

where $p_3$=percentage of new fragment that covers old fragment.

Fragments with empty-mask are not considered in the intersection test. When an intersection is found, a portion of new fragment is visible, so the depth test is not necessary.

At the end of the intersection test, the shape masks of the two old fragments and the new fragment have been updated, for each board pixel. The values of the coverage areas are also updated.

Figure 16:
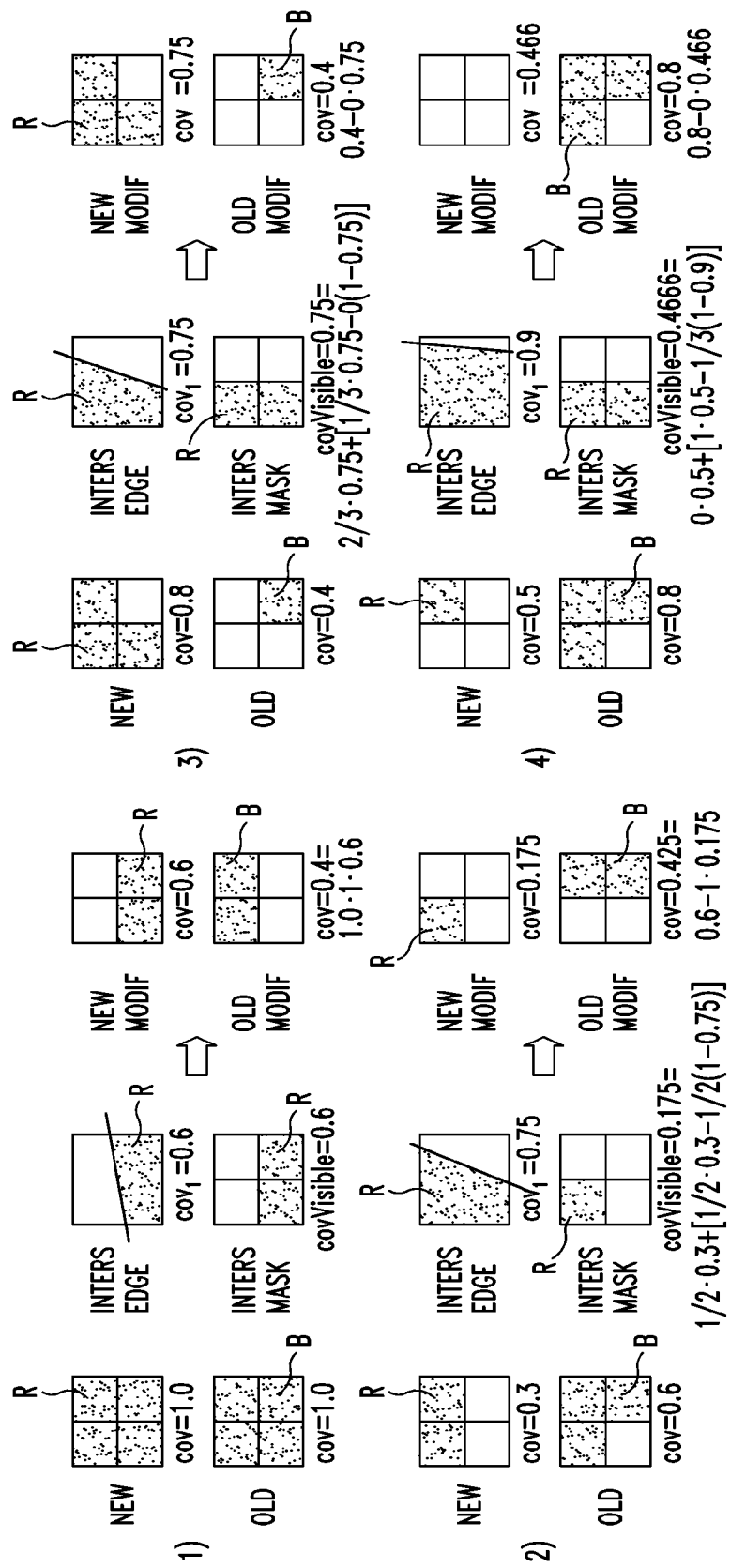

FIG. 16 shows examples of the intersection mask (Inters Mask) and the intersection edge mask (Inters Edge) for four particular cases (R=red and B=Blue).

Example of Operation of the Z Plane Evaluation Stage 231.

It has to be observed that in order to perform the following depth test (stage 232), a depth value for the three fragments (the new one and the two previous stored) is computed.

According to the example, the new depth value is evaluated with its plane and barycenter:

$$z = A \cdot x_{baryc} + B \cdot y_{baryc} + D$$

coefficient A, B and D are computed as already described by the rasterizer 503.

For the two old fragments, Z plane evaluation can be performed in accordance with the same conditions:

if the new plane is equal to the old plane, then old depth value is equal to new depth value (doing this it is ensured that the last fragment will pass depth test). Two planes are equals if all their coefficients are equals with a threshold (the intersection edge equation is an identity).

if the two planes are not equals, then old depth value is evaluated with its plane and in its barycenter.

Example of Operation of the Depth Test Stage 232.

The depth test stage 232 compares the new depth value with the two old depth values, and "kills" the new fragment only if its depth value is greater than both old depth values. In other words, the depth test carried by stage 232 eliminates occluded fragments.

It is observed that it is preferable to carry out depth test 232 after the intersection test stage 230, because fragments with big depth value don't have to be killed if they have a visible part caused by an intersection.

Figure 17:
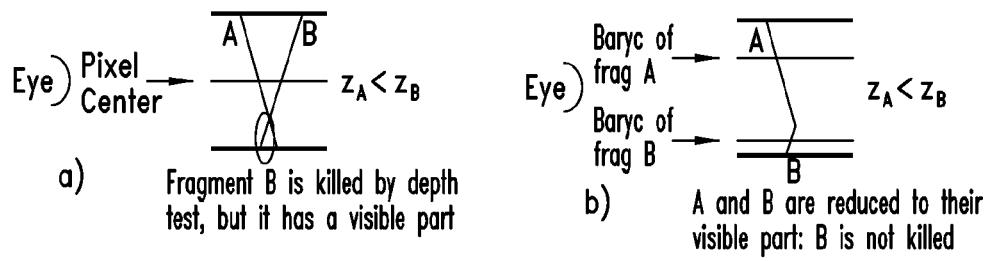
FIG. 17 illustrates different results of an intersection test and a depth test depending on their order.

FIG. 17 shows a situation a) in which a fragment A having, depth zA, intersects a fragment B, having depth $z_B$, $z_A < z_B$. In situation a) wherein a intersection test 230 is performed after the depth test, a visible portion of fragment B is killed. FIG. 17 also shows situation b) in which the intersection test 230 is performed before the depth test. Thanks to the intersection test stage 230, fragments A and B are reduced to their visible parts and fragment B is not killed.

Example of Operation of the Alpha-Blend Test Stage 233

The alpha-blend test stage 233 allows to modify the new fragment color with the other two colors stored in the same pixel position. Three possible different situations are analyzed.

Figure 18:
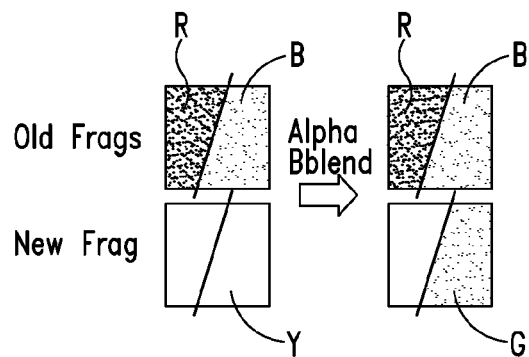
FIGS. 18, 19 and 20 show different situations of managing an alpha-blend test, in accordance with an embodiment of the invention.

FIG. 18 refers to a first situation wherein the new fragment is perfectly overlapped with one of the two old fragments. In FIG. 18 the letter Y indicates the yellow color. In this situation the shape mask and the coverage are the same. In this case the alpha-blend is so as the color (Green, G) of the new fragment is the blending result between the new color (Y) and the overlapped one (Blue, B).

Figure 19:
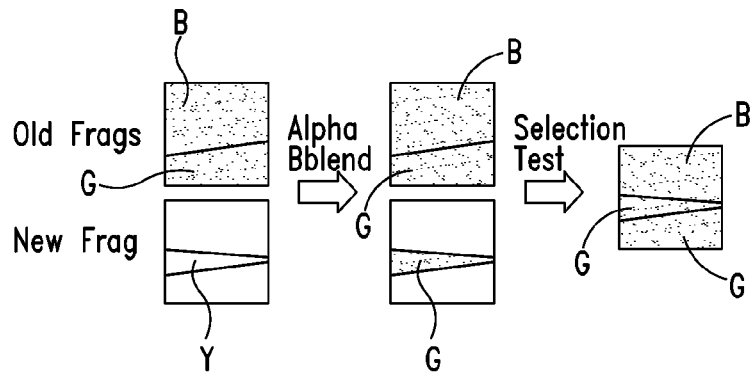

FIG. 19 illustrates a second situation wherein the new fragment is a part of previous blending result: the blending is applied in such a way that the new fragment color is equal to the previous blending color. To find this situation, the algorithm of the alpha-blend stage 233 checks whether the blending between the new color and one of the old colors is similar to the other old color. This test is done to avoid the possibility of blending the transparent new fragment with another transparent fragment already blended. In FIG. 19 the result of the selection test carried by stage 234 is also depicted by representing the two selected fragments in a two colors single fragment.

Figure 20:
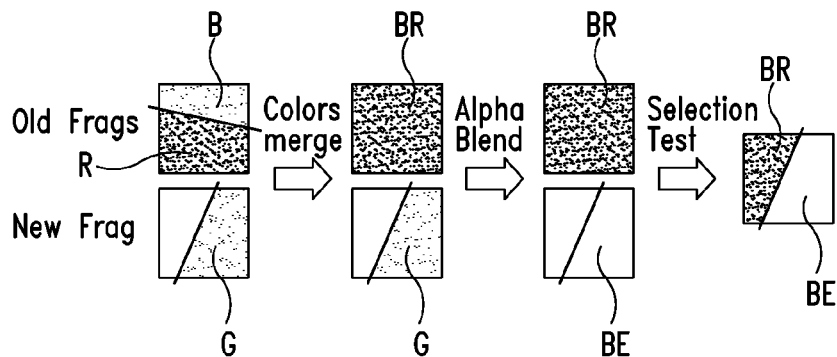

FIG. 20 shows a third situation wherein a new fragment partially covers both old colors of the old fragments. In this case stage 233 merges together the two old colors, and then a new fragment color is calculated. The plane of the merged fragment is associated to the plane of the fragment with minimum depth value. Other possible choices are to assign at the merged fragment the plane of the fragment with maximum depth or the plane of the fragment with bigger coverage area. The following colors are exemplarily shown in FIG. 20: Blue (B), Red (R) Green (G), Brown (BR) and Beige (BE).

The case in which there is only one old fragment (pixel Coverage Area is equal to 1), can be considered as a special: in such situations the merging operation is not necessary.

Example of Operation of the Selection Test Stage 234

A particular embodiment of the selection step 805 (FIG. 8), which can be carried out by the selection test stage 234 (FIG. 2), is described hereinafter. Particularly, the test carried out by selection test stage 234 considers separately internal pixels (i.e. pixels having coverage area equal to 1) and external pixels.

Internal pixels that have passed depth test can cover one or two old fragments. If an internal pixel covers only one fragment, the new fragment color will replace the covered fragment; coverage values and pixel shape masks remain the same. If the new fragment covers both old fragments then new color and shape mask will be stored, coverage will be set to 1.

In all other cases (border pixels) selection test stage 234 selects one of the three fragments (the new one and the two previously stored) to be discarded. Assuming that all the colors that compose the final pixel color could be stored, at the end of frame N colors and N coverages would be stored. The resulting color, in this hypothetical perfect antialiasing technique, is a weighted blending of the N colors.

In accordance with an example of the invention, only two colors for pixel are stored. According to an embodiment of the invention, the main selection criterion is that of selecting the two colors showing major coverage areas. Particularly, this selection is made runtime. Particular situations can be managed as indicated below.

As described with reference to FIGS. 8-12, the correction test 806 compares a new fragment with both previously memorized fragments and modifies coverage areas and shape masks of the overlapped fragments.

Particularly, to improve quality the antialiasing method a "union" of similar colors is carried out. Two colors are considered similar if the difference between each color component (Red, Green and Blue) is below a threshold.

If a color of a new fragment is similar to a color already stored, then new coverage area is added to the old coverage. The "union" of similar colors is a weighted blending between the two similar color is made, and the resulting color is stored. To the fragment resulting from union the corresponding minimum plane is selected and stored. Also the shape is associated to the near fragment.

If a new color in not similar to the other previously stored, and the new fragment is not the smaller, then the selection step 806 selects from the old fragments the one with minor coverage and replace its attributes (color, plane and mask) with new fragment's attributes.

Figure 21:
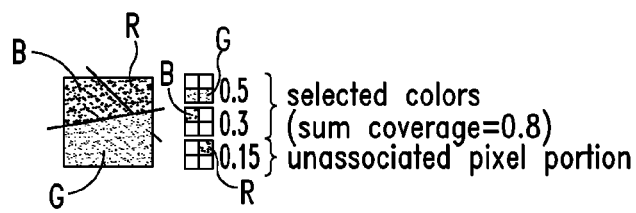
FIG. 21 shows an example of a selection test in accordance with an embodiment of the invention.

Another possible situation occurs when a pixel is subdivided into three or more pieces by corresponding edges, the selection of only two fragments generates an unassigned portion of pixel. Furthermore, the coverage-correction formula described above gives an approximated value of the real coverage area, so the sum of the three corrected-coverage values can be less than 1. FIG. 21 shows an example of surplus coverage area and mask portion.

Once selected the fragments to store, unassociated area can be calculated as $1-(cov_1+cov_2)$, where $cov_1$ and $cov_2$ are the corrected coverage areas of the stored fragments. Unassociated pixel mask is simply the shape mask of the discarded fragment.

There are many ways to assign the unassociated area and its portion of pixel mask; a particular solution is to give all to the near fragment so as to reduce the probability of bleed through, because next fragment will have more chance to cover the far fragment. Therefore, the coverage area to be stored is the coverage area of nearest fragment plus the unassociated area.

Figure 22:
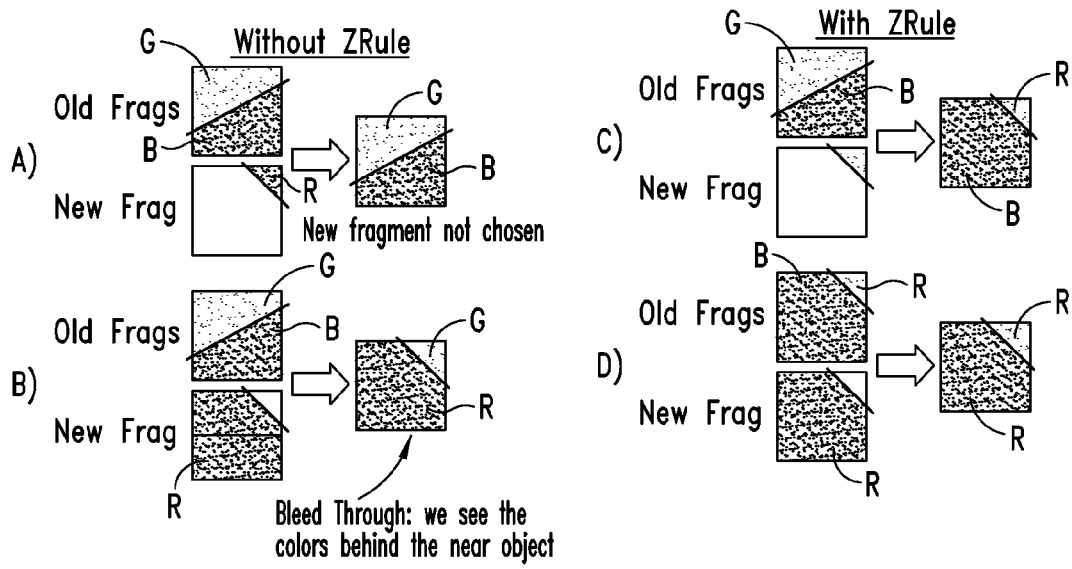
FIG. 22 shows the results of a selection test in case of application of different criteria.

It has to be observed that storing the two fragments with major coverage areas is not always the best selection. Reference is made, as an example, to the situation shown in FIG. 22 A) wherein a pixel is divided in two colors (G and B) and the new fragment (R) is not chosen by the selection test.

With reference to the next object drawn (FIG. 22B), the new fragment covers entirely the pixel, but it is formed by two fragments: the first is very small and obviously will be discarded. The result is a typical bleed through situation.

Assuming that two fragments of the same object are drawn one after the other, to avoid the above mentioned problem the selection criterion is modified by forcing the selection step to store the fragment with minor depth value, also when its coverage is the least (FIGS. 22C and 22D). In this case (i.e. application of a Z rule) the coverage to be stored is the coverage of the new fragment (FIG. 22C). That's equal to assigning the remaining piece of pixel to the far fragment.

Example of Operation of the Antialising Blending Module 204

An example of the antialising blending step 808 (FIG. 8), which can be carried out by the antialising blending module 204 of FIG. 2 is described.

At the end of each frame to be displayed on screen 71, the two colors of the stored selected fragments are blended together. The blending is carried out using the coverage information. Particularly, the color C of the resulting fragment is a combination of the colors of the two selected fragments weighed according to the corrected coverage areas.

As an example, the blending is performed in accordance with the following formula which gives the resulting color C:

$$C=cov \cdot C_0+(1-cov) \cdot C_1=cov \cdot (C_0-C_1)+C_1$$

wherein:

$C_0$ and $C_1$ are the colors (vector R, G, B and $\alpha$) of the first and second selected fragments, respectively;

cov is the corrected coverage area of the first selected fragments; and 1-cov is the corrected coverage area of the second selected fragment.

The resulting color is stored in the second color buffer 105 (FIG. 2) which is, as an example, a three rows buffer.

Example of Operation of the Adaptive Filter 205

The particular adaptive filter 205 allows to improve quality when artifacts are generated from the preceding stagers of the pipeline. Artifacts can occur when two colors are not sufficient to have good quality and when the runtime selection has chosen a wrong fragment.

Is has to be observed that this filtering process is not a full screen operation, because problematic pixels can be individuated and marked during the selection test. After the end of antialiasing blend stage 204, only particulars marked pixels will be filtered.

A pixel is marked when the three following situation occur:
- the pixel needs the ZRule, because in a three color pixel subdivision the smallest fragment has been forced to be stored (e.g., situation of FIG. 22C);
- unassociated area is greater than a given threshold: that's mean that the discarded fragment was meaningful. A good value for this threshold is 0.1;
- the new fragment is selected to be stored and it was an empty-mask fragment (that's mean that the shape mask computed by the rasterizer 503 was empty, if the mask becomes empty after the occlusion tests then pixel isn't marked).

These pixels are marked only if there are other two colors previously stored, and the new fragment is not the nearest. A previously marked pixel is unmarked when an internal fragment covers (both or only one) the stored fragments.

As an example, the adaptive filter 205 is 3×3 filter, centered in the marked pixel, that uses spatial information to find a correlation between the colors. The marked pixel is modified only if its color is not correlated with colors of adjacent pixels. When the color of a marked pixel is not correlated, then the filter determines a good color using spatial correlation of neighbor pixels.

Particularly, the adaptive filter 205 uses adaptive thresholds to identify similar colors. Like in the selection tests, two colors are considered similar when the difference between each color component (Red, Green and Blue) is under a threshold. The threshold may be different for each color component. An adaptive threshold is calculated considering the color variability inside the 3×3 filter 205. If the nine colors are similar then the threshold will be small.

In operation, the adaptive filter 205 first tests for horizontal and vertical correlations: it verifies if the pixels that form the three rows and the three columns of the 3×3 filter 205 have similar colors. If an horizontal or vertical correlation is found, then the central pixel is correlated in the same direction d (this happens only if it wasn't already correlated).

Figure 23:
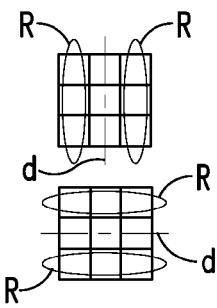
FIGS. 23, 24, 25, 26 show examples of operation of an adaptive filter.

FIG. 23 A) shows a situation in which both red groups are composed by similar colors and central pixel is not vertical correlated: then, a vertical correlation will be made. FIG. 23 B) shows a situation in which both red groups are composed by similar colors and a central pixel is not horizontal correlated: then, a horizontal correlation will be made.

If the adaptive filter 205 does not find such kind of correlation, then it searches zones of similar colors in the 3×3 mask. Basing on number and position of such zones the filter finds the best direction (horizontal, vertical or diagonal) on which to force the central correlation.

Four zones, or sub-filters, are checked. A sub-filter is internally correlated only when the three colors (excluded the central one) are similar each other.

Figure 24:
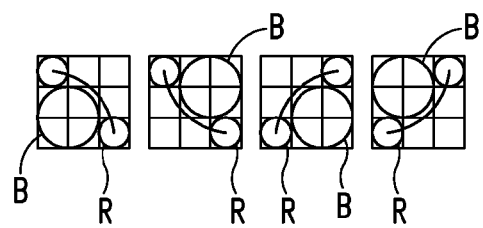
Figure 25:
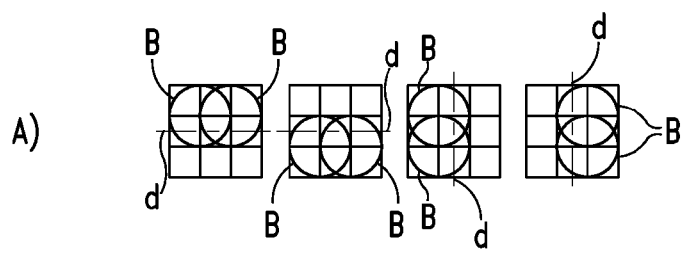
Figure 25:
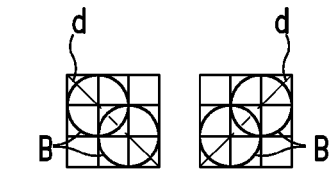
Figure 26:
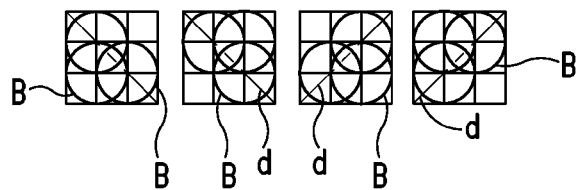

The four sub-filters can't be all internally correlated, because this situation is possible only if there is an horizontal or vertical correlation like the one found in the previous test. For that reason, the four possible situations are:
  none of the sub-filters are internally correlated. If there is at least one horizontal or vertical correlation (already found in the previous test), then the central pixel is correlated horizontally or vertically. Otherwise the central pixel color is not modified;
  only one sub-filter is internally correlated (FIG. 24). Also in this case, if there is at least one horizontal or vertical correlation, then the central pixel is correlated horizontally or vertically. Otherwise the filter 205 makes a vertical correlation test. Basing on the position of the correlated sub-filter, the test verifies if diagonal pixel colors are similar. If they are similar then the central pixel is correlated in that direction d.
  the two sub-filters are internally correlated (FIG. 25A). If sub-filters are horizontally or vertically positioned, then horizontal or vertical correlation is made, respectively. If sub-filters are diagonally positioned (FIG. 25B) then the central correlation direction d is the same diagonal, but the central pixel is modified only when the outermost colors are similar.
  three sub-filters (Blue) are internally correlated (FIG. 26). In this situation, only diagonal correlation is possible. The direction d of the central pixel correlation is given by diagonal sub-filters position.

Figure 27:
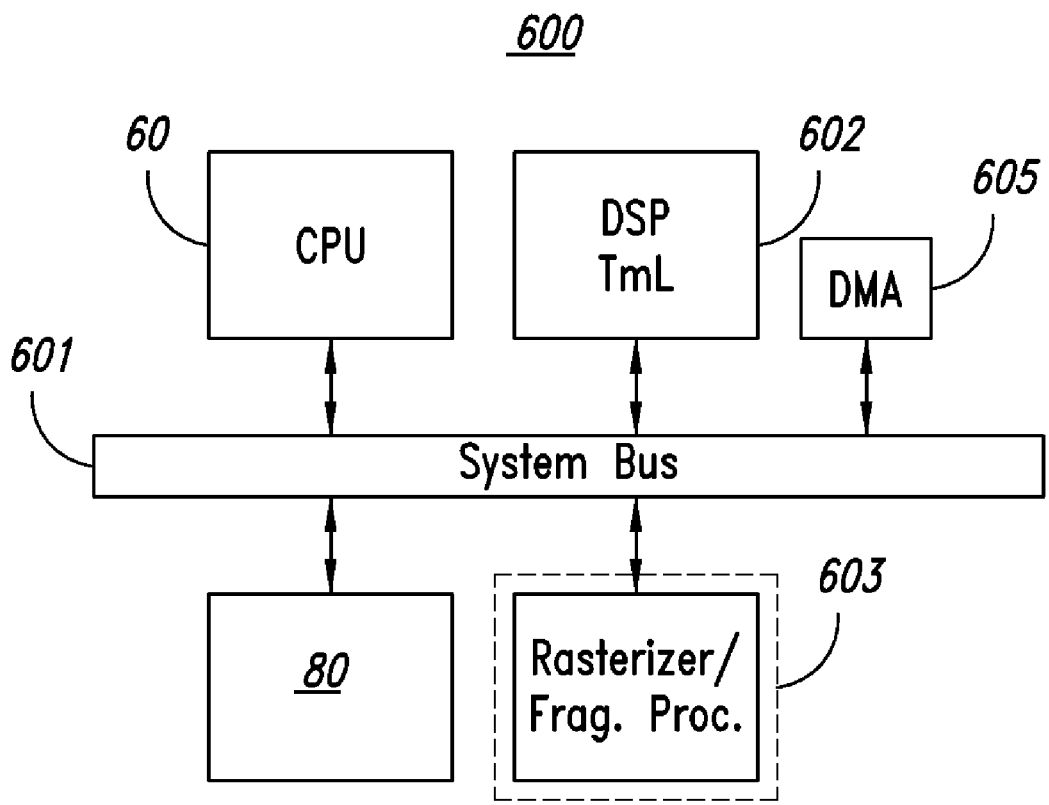
FIG. 27 shows an apparatus which can be used to implement said graphic modules.

FIG. 27 illustrates an apparatus 600 which can be employed to implement the graphic module 500 described with reference to FIG. 2. The apparatus 600 includes a system bus 601 which allows the information and data exchange with the CPU 60 (also shown in FIG. 1) and the system memory 80. The CPU 60 allows to perform the function of the driver 501 and can be an advanced RISC machine (ARM). The data exchange with the system memory 80 can be managed by suitable interfaces 605 such as DMAs (direct memory access).

Moreover, apparatus 600 is provided with a digital signal processor 602, such as a Multimedia Digital Signal Processor 602 (MMDSP+) or ST2xx DSP family processor, which can perform the functions of the geometry stage 502. A hardware block 603 is configured to perform the functions of the rasterizer stage 503 and fragment processor 504.

As clear from the description of the above examples and embodiments, the teachings of the invention are applicable to any type of graphic systems but they show particular advantages for "embedded" applications such as for graphic applications to be run on systems having limited computing power and memory capacity.

It has to be noticed that the above described methods and systems can also be employed in 2D computer graphics and not only in 3D computer graphics. In 2D computer graphics the intersection test stage 230, the Z plane evaluation stage 231, the depth test stage 232 and the plane buffer 102 are not employed and so they can be avoided.

The embodiments described show many advantages over the prior art techniques. The use of an antialiasing procedure employing a corrected coverage area, which takes into account the fragment occlusion, allows to achieve a quality which is greater than the quality obtained with the prior art techniques.

Figure 30:
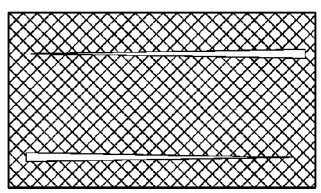
FIG. 30 shows experimental results which allow to compare a particular method with prior art techniques.
Figure 30:
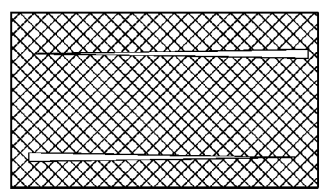
Figure 30:
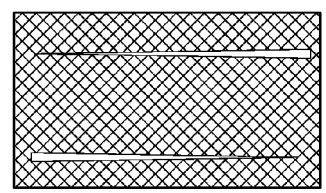

FIG. 30 shows the results of different antialiasing techniques with reference to the rendering of needles. In FIG. 30, A) refers to a method according to an embodiment the invention and employing the graphic module 500 described with reference to FIGS. 2 and 3; and B) and C) refer to FSAA techniques of the type 4× and 16×, respectively. The needles of FIG. 30 A) show a quality greater that the needles obtained with the other antialiasing techniques.

It has to be observed that, contrary to the multisampling techniques, the antialiasing method described can be carried out without requiring more than one sample per pixel and therefore it does not require a high memory usage. Moreover, since the antialiasing technique described can be carried out without requiring pixels other than border pixels, it does not increase the necessary memory and bandwidth.

The following Table 1 compares statistic values for bandwidth and memory usage of a rendering method not employing full screen antialiasing, the supersample and multisample techniques and the method in accordance with one embodiment of the invention ("Edge antialiasing 1×").

| Algorithm | Bandwidth | Memory Usage |
| --- | --- | --- |
| No Full Screen Antialiasing | 1 | 1 |
| Supersample 4x | ~3.75 | 4 |
| Multisample 4x | ~3.15 | 4 |
| Supersample 16x | ~14.75 | 16 |
| Multisample 16x | ~11.75 | 16 |
| Edge Antialiasing 1x | ~3.15 | 3.5 |

The technique in accordance with the embodiment of the invention doesn't depend on sample numbers: it has a constant bandwidth and memory. Both, bandwidth and memory usage, are less than a 4×FSAA.

Furthermore, the use of the intersection test stage 230 and the alpha-blend test stage 233 allow to manage the occlusions generated by primitives intersection and the transparence effect in a particularly effective manner.

First Example of Coverage Area Computing Method.

As already defined the coverage area represents a portion of a fragment covered by a specific primitive. As an example, coverage area is equal to 1 for internal (not border) pixels, and is equal to a value included in a range [0 . . . 1] for border pixels. The computing of the coverage area is performed on space screen coordinates. A first example of a method applicable for computing the coverage area is described in the following.

A line with coordinate $(x_0,y_0)$ and $(x_1,y_1)$ as extremes (triangle edge vertices) is considered. A point with (x,y) space screen coordinates. The edge value function is:

$E=(y_1-y_0)x-(x_1-x_0)y-x_0y_1+x_1y_0$.

Hence the shape is: $E=ax+by+c$.

When $E=0$ an equation of a typical line is obtained.

Particularly, the coverage area calculation depends on distance. The distance between a point from a line is proportional to edge equation value.

According to the present example, rasterizer 503 computes the following quantity D:

$$D = \frac{E}{\sqrt{a^2+b^2}}$$

where D is a normalization of E with the hypotenuse of points $(x_0,y_0)$ and $(x_1,y_1)$ coordinates of extreme lines. D represents the distance between the center of the pixel and the edge of the primitive crossing the pixel. The parameters a, b, c and sqrt are calculated only once for all pixels of the same triangle, by means of the rasterizer 503. The approximated coverage area cov is computed by the formula:

$cov=½+D$.

Figure 28:
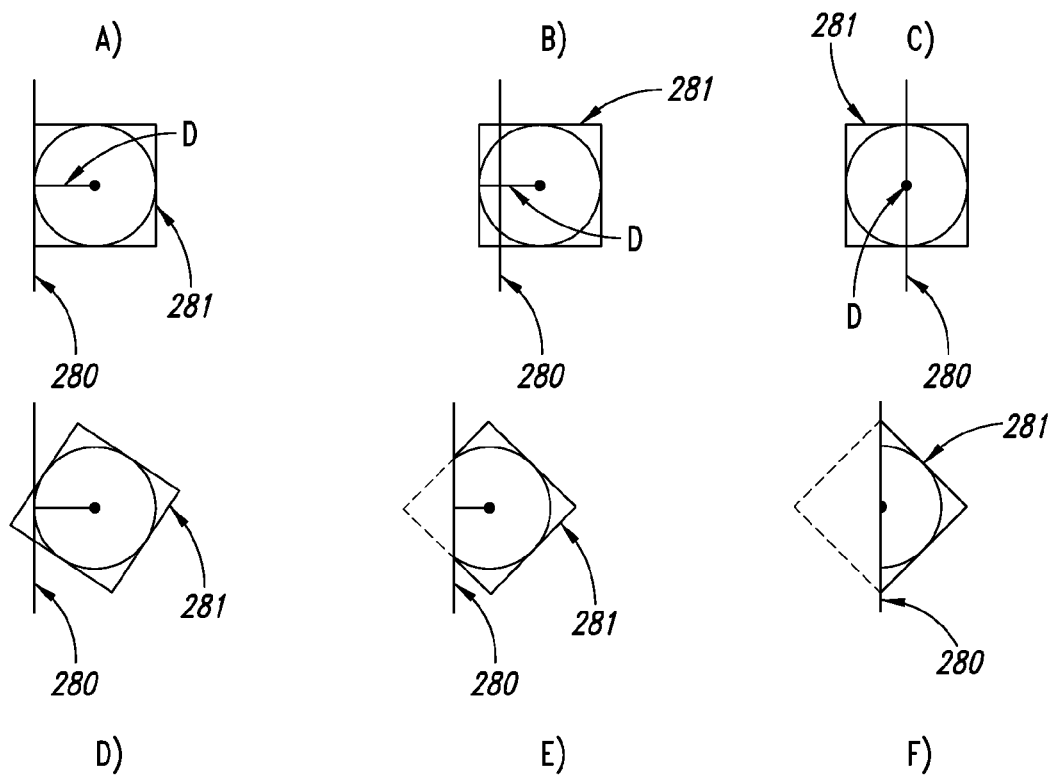
FIG. 28 illustrates examples of different pixel coverage situations with reference to a first coverage computing method.

FIG. 28 shows several cases of D values with reference to primitives having edge 280 crossing pixels 281:

FIG. 28 A), the best case: D=0.5; cov=1;

FIG. 28 B): D=0.25; cov=0.75;

FIG. 28 C): D=0; cov=0.5;

FIG. 28 D), the worst case: D=0.5; cov=1 (real coverage area is 0.95);

FIG. 28 E): D=0.35; cov=0.85 (real coverage area is 0.875);

FIG. 28 F): D=0; cov=0.5=real coverage area.

Second Example of Coverage Area Computing Method.

Figure 29:
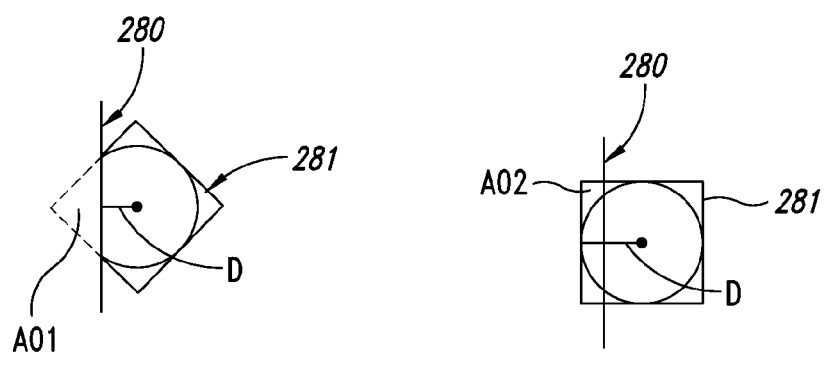
FIG. 29 illustrates examples of different pixel coverage situations with reference to a second coverage computing method.

According to another example, it is possible to compute the coverage area in a different way so as to achieve a value more precise than the one obtainable with the method above described. The applicants have noticed that there are two possible cases:

the area AO1 which is not included in the primitive is a triangle (e.g., FIG. 29 A);

the area AO2 which not included in the primitive is a rectangle (e.g., FIG. 29 B).

The equation line is:

$0=ax+by+c$

The equation line depends by distance D and slow rate m. into the first case (triangle), the equation line becomes:

$$x = my + \frac{1}{2} - \frac{m}{2} - D\sqrt{1+m^2}$$

Where $m=-b/a$. In this case the coverage area cov is:

$$cov = 1 - \frac{(2D\sqrt{1-m^2}-(m+1))^2}{8m}$$

considering that D is:

$$D = \frac{E}{\sqrt{a^2+b^2}} = \frac{E}{a\sqrt{1+m^2}}$$

the coverage area becomes:

$$cov = 1 - \frac{(m+1)^2}{8m} + \frac{E(m+1)}{2ma} + \frac{E^2}{2ma^2}$$

Where $m=-b/a$, so it is equivalent:

$$cov = 1 - \frac{(a+b)^2}{8ba} + \frac{E(a+b)}{2ba} - \frac{E^2}{2ba} \quad (1)$$

Only E depends on the pixel; the other values are the same for the same primitive.

In the second case (rectangle), the coverage area cov becomes:

$$cov = \frac{1}{2} + D\sqrt{1+m^2}.$$

Hence it becomes $$cov = \frac{1}{2} + \frac{E}{a}. \quad (2)$$

The two formulas use two divisions per edge.

According to a particular embodiment, it is possible to have only one division per edge by defining a quantity "invab": $invab=1/ab$ The formulas (1) and (2) become:

$$cov = 1 - invab * \left(\frac{(a+b)^2}{8} + \frac{E(a+b)}{2} + \frac{E^2}{2}\right) \quad (3)$$

$$cov = \frac{1}{2} + invab * b * E \quad (4)$$

just E value is pixel dependent.

There is a value of m to switch the two formulas (3) and (4):

$$\overline{m} = \frac{2D\sqrt{1-(4D-1)^2}-1}{(4D-1)^2}.$$

The switch point uses many and complex calculations.

It is possible to change way by using an edge equation.

The sign of edge equation calculated on corner allows selection of correct formula. All considerations are true with m<=1.

Particular Example of an Antialiasing Method

Figure 31:
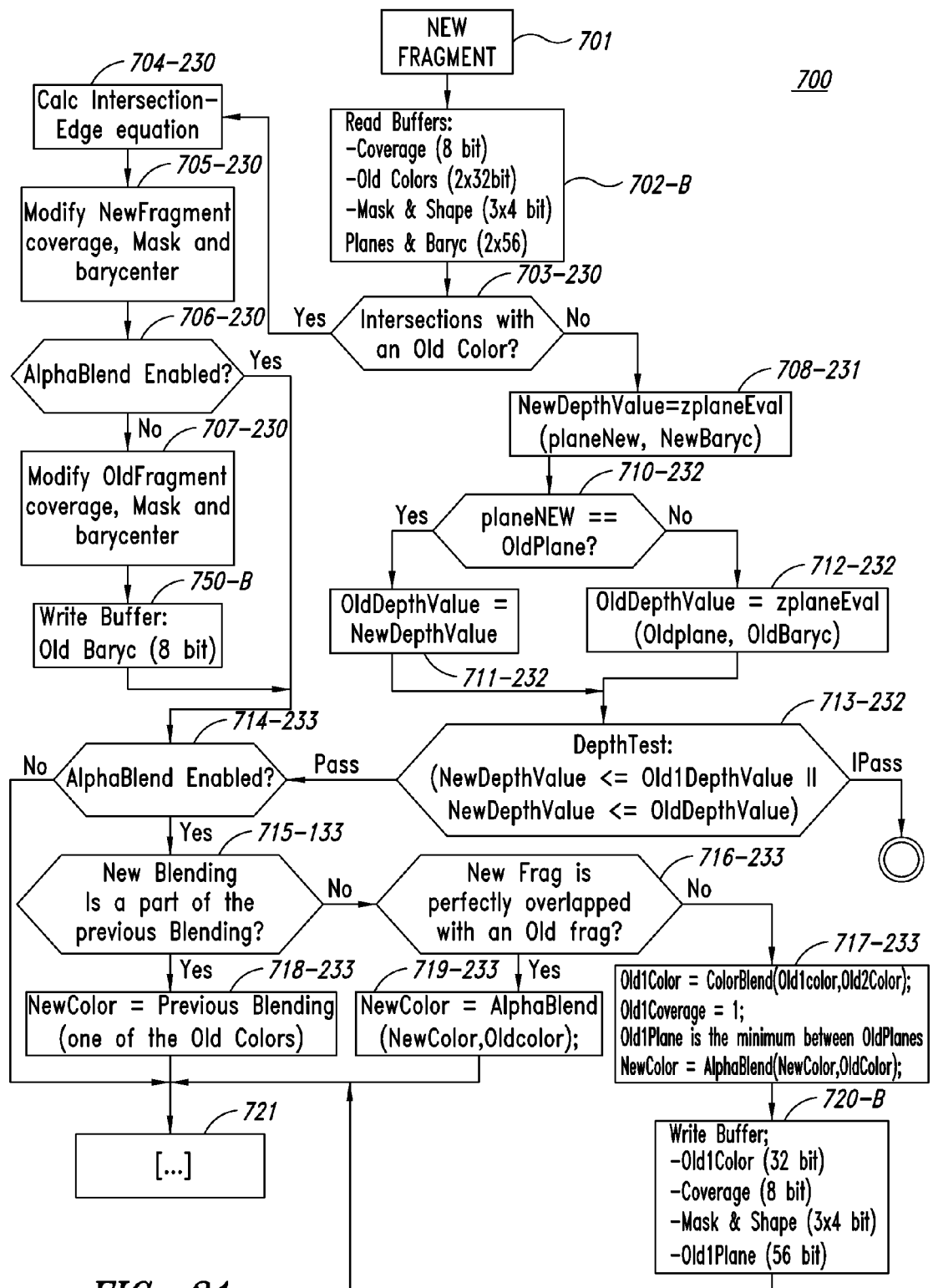
FIGS. 31 and 32 show by means of a flow chart an example of an antialiasing method.
Figure 32:
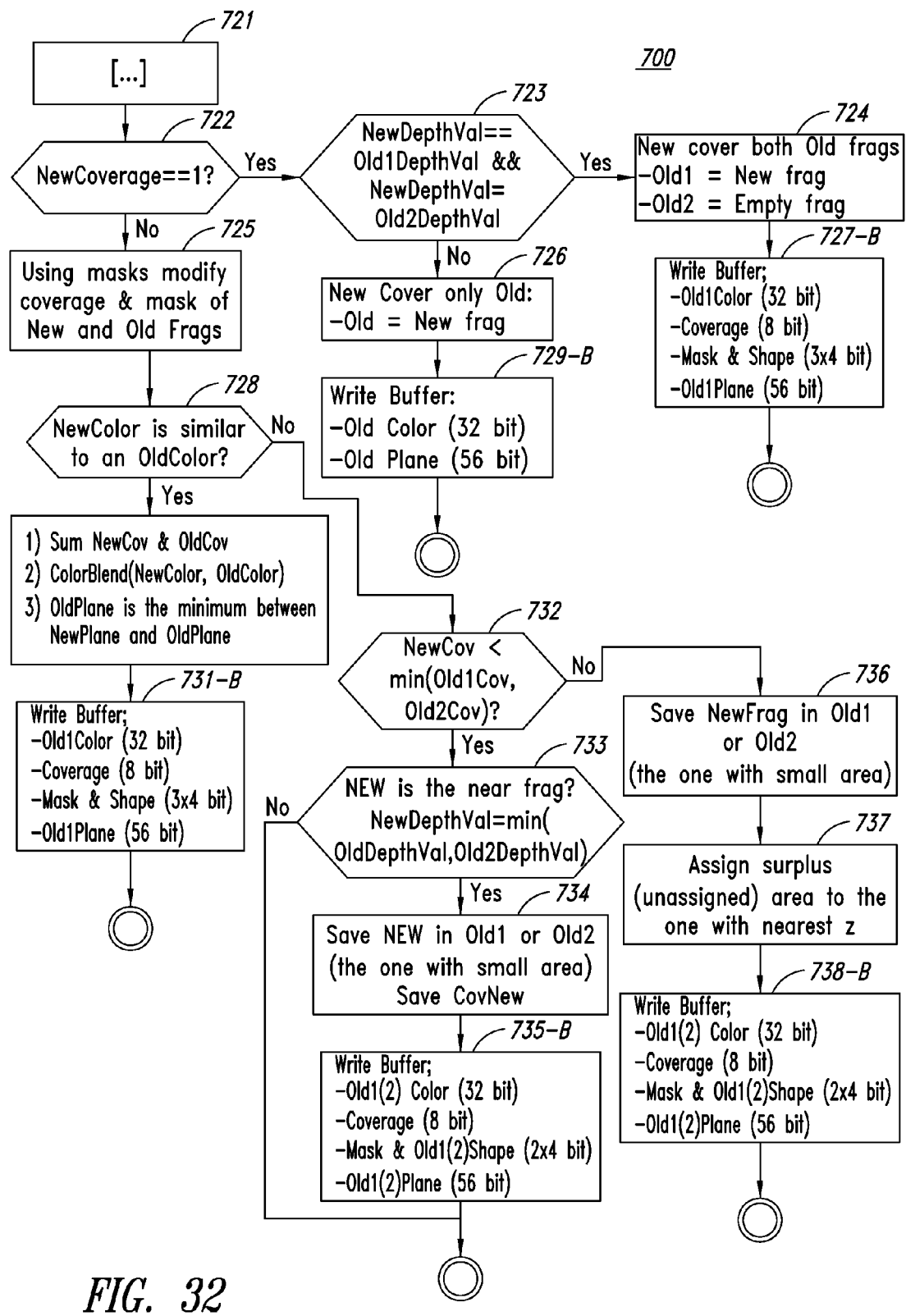

FIG. 31 and FIG. 32 illustrate, by means of a flow chart, the steps of a particular antialiasing method 700 which can be carried by the graphic system 500 shown in FIG. 2 and in FIG. 3. Each flow chart block of FIGS. 31 and 32 includes an explanation of the respective step performed and is in accordance with the above description of examples of operation of the rasterizer 503, the intersection test stage 230, the Z plane evaluation stage 231, the depth test stage 232, the alpha-blend test stage 233 and the selection test stage 234.

Particularly, steps 702-B, 750-B, 720-B, 727-B, 729-B, 731-B, 735-B, and 738-B represent buffer reading and/or writing steps. The new fragment to be processed is provided in step 701. Steps 703-230, 704-230, 705-230, 706-230 and 707-230 are carried out by the intersection test stage 230. Steps 709-231, 710-231, 711-231, 712-231 are carried out by the Z plane evaluation stage 231. Step 713-232 is performed by the depth test stage 232. The steps carried out by the alpha-blend test stage 233 are indicated with reference numbers 714-233, 715-233, 716-233, 717-233, 718-233, 719-233. The operation of the selection test stage 234 is represented by steps 722, 723, 724, 725, 726, 728, 730, 732, 733 (application of the Z rule), 734, 736 and 737.

In an embodiment, a computer-readable medium's contents cause a computing device to perform a graphic antialiasing method comprising: providing a first fragment; computing a first coverage area representing a portion of the first fragment covered by a first primitive; providing a second fragment juxtaposed to the first fragment and at least partially covered by a second primitive; processing the first coverage area to obtain a corrected coverage area indicative of a visible first fragment portion resulting from the juxtaposition of said fragments; and applying an antialiasing procedure based on said corrected coverage area. In an embodiment, the method further includes: defining a first plane and a second plane on which corresponding primitives lie; computing an intersection edge of the first and second planes; and selecting an intersection pixel which is crossed by said intersection edge. In an embodiment, the method further includes: selecting first and second selected fragments among a plurality of fragments associated with the same border pixel, wherein a border pixel is a pixel crossed by at least one edge of a primitive to be renderized.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An antialiasing method, comprising:
under control of at least one processor,
providing a first fragment;
computing a first coverage area representing a portion of the first fragment covered by a first primitive;
providing a second fragment juxtaposed to the first fragment and at least partially covered by a second primitive;
processing the first coverage area to obtain a corrected coverage area indicative of a visible first fragment portion resulting from the juxtaposition of said fragments; and
applying an antialiasing procedure based on said corrected coverage area.

2. The method of claim 1, further comprising:
computing a second coverage area representing a portion of the second fragment covered by the second primitive.

3. The method of claim 2, wherein computing the first and the second coverage areas includes:
employing edge equations of the first and second primitives.

4. The method of claim 2, further comprising:
processing the second coverage area to obtain a further corrected coverage area indicative of a visible second fragment portion resulting from the juxtaposition of said fragments.

5. The method of claim 1, further including:
associating with the first fragment a first shape mask comprising four bits each associated with a corresponding corner of the first fragment;
setting bits of the first shape mask to a first value when the corresponding corners are inside the first primitive; and
setting further bits of the first shape mask to a second value when the corresponding corner is outside the primitive, wherein bit values setting is performed employing edge equation of the first primitive.

6. The method of claim 5, further comprising:
defining from the first shape mask a first approximate coverage area assuming one of the following values depending on the number of the corners inside the first primitive: ¼, ½, ¾, and 1; the first approximate coverage area being indicative of the first coverage area.

7. The method of claim 6, further comprising:
computing a second coverage area representing a portion of the second fragment covered by the second primitive;
associating with the second fragment a second shape mask; and
defining from the second shape mask a second approximate coverage area indicative of the second coverage area.

8. The method of claim 7, wherein processing the first coverage area to obtain a corrected coverage area comprises:
computing an approximate visible area indicative of the visible first fragment portion resulting from the juxtaposition of said fragments; the approximate visible area being computed using the first and the second approximate coverage areas;
processing the first and the second coverage areas, the first and the second approximate coverage areas and the approximate visible area to obtain said corrected coverage area; and
storing the corrected coverage area.

9. The method of claim 8, wherein processing the first and the second coverage areas includes:
computing a percentage area representing area of the second fragment that covers the first fragment.

10. The method of claim 1, further comprising:
defining a first plane and a second plane on which corresponding primitives lie;
computing an intersection edge of the first and second planes; and
selecting an intersection pixel which is crossed by said intersection edge.

11. The method of claim 10, comprising:
associating with the selected intersection pixel an intersection edge shape mask comprising four bits each associated to a corresponding corner of the first fragment and indicating a visible fraction area.

12. The method of claim 11, comprising:
using the intersection edge shape mask to define further shape masks associated to an old fragment previously submitted and to a new fragment submitted;
storing said further shape masks; and
defining a new coverage area of the new fragment by correcting said new coverage area based on the intersection of said primitives.

13. The method of claim 1, further comprising:
selecting first and second selected fragments among a plurality of fragments associated with the same border pixel; wherein a border pixel is a pixel crossed by at least one edge of a primitive to be renderized.

14. The method of claim 13, further comprising:
storing a first color associated with said first selected fragment; and
storing a second color associated with said second selected fragment.

15. The method of claim 14, wherein applying the antialiasing procedure comprises:
processing the first and the second colors together with the corrected coverage area to define a color to be associated with a pixel to be displayed.

16. The method of claim 15, wherein processing the first and the second colors includes:
performing an antialiasing blending of the first and second colors.

17. The method of claim 13, comprising, before selecting the first and the second selected fragments:
storing in a buffer a first old fragment and a second old fragment associated with a same pixel; and
receiving a submitted fragment associated with the same pixel.

18. The method of claim 17, comprising:
associating a depth value with the submitted fragment.

19. The method of claim 18, wherein associating the depth value with the submitted fragment includes:
computing coordinates of a barycenter of said submitted fragment using a crossing edge equation of a respective primitive crossing said submitted fragment;
defining a plane containing said fragment; and
defining said depth value by computing an assumed depth value of a plane equation in said barycenter; wherein the plane equation defines the plane containing said respective primitive.

20. The method of claim 17, comprising applying a depth test to the submitted fragment including:
comparing an associated depth value associated with the submitted fragment to another depth value associated with one of said old fragments;
eliminating one of said old fragments if the another depth value is greater than the depth value of the submitted fragment; and
storing the submitted fragment.

21. The method of claim 17, further including:
applying an alpha blend test considering a transparence effect to said first and second old fragments and the submitted fragments.

22. The method of claim 21, comprising:
modifying a color of the submitted fragment considering colors of the first and second old fragments.

23. The method of claim 13, wherein selecting first and second selected fragments includes:
receiving a new submitted fragment; and
applying a selection criterion to replace one of said first and second selected fragments with the new submitted fragment or to discard the new submitted fragment.

24. The method of claim 23, wherein said selection criterion is so as to select and store two fragments having major coverage areas among the first and second selected fragments and the new submitted fragment.

25. The method of claim 23, wherein said selection criterion is so as to discard one fragment having greater depth among the first and second selected fragments and the new submitted fragment.

26. The method of claim 13, further comprising:
storing a first color associated with said first selected fragment; and
storing a second color associated with said second selected fragment, wherein applying the antialiasing procedure comprises:
processing the first and the second colors together with the corrected coverage area to define a color to be associated with a pixel to be displayed, wherein said processing of the first and the second colors includes:
performing an antialiasing blending of the first and second colors; and
combining the first and second colors by using the corrected coverage area as a weight to determining a contribution of the first color.

27. The method of claim 13, further comprising:
storing a first color associated with said first selected fragment;
storing a second color associated with said second selected fragment, wherein applying the antialiasing procedure comprises processing the first and the second colors together with the corrected coverage area to define a color to be associated with a pixel to be displayed; and
modifying the color associated with the pixel to be displayed if it color is not correlated with colors of adjacent pixels to be displayed.

28. The method of claim 27, wherein pixels are considered not correlated when difference between the respective colors are greater than a threshold value.

29. The method of claim 27, wherein modifying the color associated with the pixel to be displayed includes:
applying spatial correlation to said color associated with the pixel to be displayed and the colors associated with neighbor pixels so as to define a filtered color.

30. The method of claim 29, wherein applying spatial correlation includes:
determining a direction along which pixels show a color correlation.

31. A system comprising:
a screen device structured to display scenes;
a processing module structured to provide a first fragment at least partially covered by a first primitive and a second fragment juxtaposed to the first fragment and at least partially covered by a second primitive;
a computing module structured to compute a first coverage area representing a portion of the first fragment covered by the first primitive;
a correction module configured to process the first coverage area to obtain a corrected coverage area indicative of a visible first fragment portion resulting from the juxtaposition of said fragments; and an antialiasing module structured to provide a pixel to be displayed on said screen device based on said corrected coverage area.

32. The system of claim 31, wherein said processing module is structured to compute a second coverage area representing a portion of the second fragment covered by a second primitive.

33. The system of claim 32, wherein said processing module is structured to compute the first and the second coverage areas employing edge equations of the first and second primitives.

34. The system of claim 31, further including a shape mask buffer storing a first shape mask comprising four bits each associated with a corresponding corner of the first fragment; wherein:
bits of the first shape mask are equal to a first value when the corresponding corners are inside the first primitive; and
further bits of the first shape mask are equal to a second value when the corresponding corner is outside the primitive.

35. The system of claim 34, further comprising a coverage buffer storing a first approximate coverage area assuming one of the following values depending on the number of the corners inside the first primitive: $\frac{1}{4}$, $\frac{1}{2}$, $\frac{3}{4}$, and 1; the first approximate coverage area being indicative of the first coverage area.

36. The system of claim 31, further comprising a selection module configured to select first and second selected fragments among a plurality of fragments associated to the same border pixel; wherein a border pixel is a pixel crossed by at least one edge of a primitive to be renderized.

37. The system of claim 36, further comprising a first color buffer storing:
a first color associated with said first selected fragment; and
a second color associated with said second selected fragment.

38. The system of claim 37, wherein said antialiasing module is structured to process the first and the second colors together with the corrected coverage area to define a color to be associated with a pixel to be displayed.

39. The system of claim 38, wherein said antialiasing module is structured to perform an antialiasing blending of the first and second colors.

40. The system of claim 31, further comprising and intersection test stage configured to determine a pixel crossed by an intersection edge generated by the intersection of at least two primitives.

41. The system of claim 40, further comprising a plane evaluation stage configured to associate a depth value with a submitted fragment.

42. The system of claim 41, wherein the plane evaluation stage is configured to:
compute coordinates of a barycenter of said submitted fragment using a crossing edge equation of a respective primitive crossing said submitted fragment;
define a plane containing said fragment; and
define said depth value by computing the assumed depth value of a plane equation in said barycenter; wherein the plane equation defines the plane containing said respective primitive.

43. The system of claim 42, further comprising a depth test stage configured to:
compare the associated depth value associated with the submitted fragment to further depth values associated with two previous stored fragments; and
eliminate one of said previous stored fragments if the associated further depth value is greater than the depth value of the submitted fragment.

44. The system of claim 42, further including an alpha blend test stage structured to apply a transparence effect to fragments.

45. The system of claim 36, further comprising:
a selection test module structured to:
receive a new submitted fragment; and
apply a selection criterion to replace one of said first and second selected fragments with the new submitted fragment or to discard the new submitted fragment.

46. The system of claim 45, wherein said selection criterion is so as to select and store two fragments having major coverage areas among the first and second selected fragments and the new submitted fragment.

47. The system of claim 45, wherein said selection criterion is to discard one fragment having greater depth among the first and second selected fragments and the new submitted fragment.

48. The system of claim 31, wherein said system is one of the following systems: a mobile telephone, a personal digital assistant, a game console, a car navigation system, and a set top box.

49. A graphic module comprising:
a processing module structured to provide a first fragment covered by a first primitive and a second fragment juxtaposed to the first fragment and at least partially covered by a second primitive;
a computing module structured to compute a first coverage area representing a portion of a first fragment covered by a first primitive;
a correction module configured to process the first coverage area to obtain a corrected coverage area indicative of a visible first fragment portion resulting from the juxtaposition of said fragments; and
an antialiasing module structured to provide pixels to be displayed on said screen device based on said corrected coverage area.

50. The graphic module of claim 49, comprising:
a rasterizer including said processing module and said computing module; and
a fragment processor including said correction module and said antialiasing module.

51. The graphic module of claim 49, further comprising a first color buffer storing:
a first color associated with said first selected fragment, and
a second color associated with said second selected fragment;
wherein said antialiasing module is structured to process the first and the second colors together with the corrected coverage area to define a color to be associated with a pixel to be displayed.

52. The graphic module of claim 49, wherein said graphic module is configured to perform 3-D graphic rendering.

53. The graphic module of claim 31, wherein said graphic module is configured to perform 2-D graphic rendering.

54. A graphic antialiasing method comprising:
under control of at least one processor,
selecting first and second fragments among a plurality of fragments associated with a border pixel crossed by at least one edge of a primitive;
storing first and second colors associated with said first and second fragments, respectively;
defining a color to be associated with a pixel to be displayed by processing said first and second colors according to a two colors antialiasing procedure, wherein the two colors antialiasing procedure comprises blending said first and second colors;

computing a first coverage area representing a portion of the first fragment covered by a first primitive, the second fragment being juxtaposed to the first fragment which is at least partially covered by a second primitive; and processing the first coverage area to obtain a corrected coverage area indicative of a visible fragment portion resulting from the juxtaposition of said first and second fragments.

55. The graphic antialiasing method of claim 54 wherein the blending of the two colors is based on said corrected coverage area.

56. A non-transitory computer-readable medium whose contents cause a computing device to perform a graphic antialiasing method comprising:

providing a first fragment;

computing a first coverage area representing a portion of the first fragment covered by a first primitive;

providing a second fragment juxtaposed to the first fragment and at least partially covered by a second primitive;

processing the first coverage area to obtain a corrected coverage area indicative of a visible first fragment portion resulting from the juxtaposition of said fragments; and applying an antialiasing procedure based on said corrected coverage area.

57. The non-transitory computer-readable medium of claim 56, wherein the method further includes:

defining a first plane and a second plane on which corresponding primitives lie;

computing an intersection edge of the first and second planes; and selecting an intersection pixel which is crossed by said intersection edge.

58. The non-transitory computer-readable medium of claim 56, wherein the method further includes:

selecting first and second selected fragments among a plurality of fragments associated with the same border pixel; wherein a border pixel is a pixel crossed by at least one edge of a primitive to be renderized.

59. The method of claim 1 wherein the at least one processor is a graphics system comprising:

a processing module configured to provide the first fragments;

a computing module configured to compute the first coverage area;

a processing module configured to provide the second fragment;

a correction module configured to process the first coverage area to obtain the corrected coverage area; and an antialiasing module configured to apply the antialiasing procedure.

60. The method of claim 54 wherein the at least one processor is a graphics system comprising:

a selection module configured to select the first and second fragments;

an antialiasing module configured to storing the first and second colors and to define the color to be associated with the pixel to be displayed;

a processing module configured to compute the first coverage area; and a correction module configured to process the first coverage area to obtain the corrected coverage area.

61. A method comprising:

under control of at least one processor, selecting first and second fragments among a plurality of fragments associated with a border pixel crossed by at least one edge of a primitive;

storing first and second colors associated with said first and second fragments, respectively; and defining a color to be associated with a pixel to be displayed by processing said first and second colors according to a two colors antialiasing procedure based on a plane of a first primitive, a pixel shape mask and a coverage mask.

62. The method of claim 61 wherein the two colors antialiasing procedure comprises:

blending said first and second colors.

63. The method of claim 62, comprising:

computing a first coverage area representing a portion of the first fragment covered by the first primitive, the second fragment being juxtaposed to the first fragment which is at least partially covered by a second primitive; and processing the first coverage area to obtain a corrected coverage area indicative of a visible fragment portion resulting from the juxtaposition of said first and second fragments.

64. The method of claim 63 wherein the blending of the two colors is based on said corrected coverage area.

* * * * *